(12) United States Patent
Bai et al.

(10) Patent No.: US 12,349,180 B2
(45) Date of Patent: Jul. 1, 2025

(54) FULL DUPLEX COMMUNICATIONS IN WIRELESS NETWORKS

(71) Applicant: Intel Corporation, Santa Clara, CA (US)

(72) Inventors: Jingwen Bai, San Jose, CA (US); Shu-ping Yeh, Campbell, CA (US); Yang-Seok Choi, Portland, OR (US); Francesc Guim Bernat, Barcelona (ES); Kshitij Arun Doshi, Tempe, AZ (US); Ned M. Smith, Beaverton, OR (US); Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 17/482,949

(22) Filed: Sep. 23, 2021

(65) Prior Publication Data

US 2023/0099849 A1 Mar. 30, 2023

(51) Int. Cl.
*H04W 72/542* (2023.01)
*H04W 52/32* (2009.01)
*H04W 72/23* (2023.01)

(52) U.S. Cl.
CPC ....... *H04W 72/542* (2023.01); *H04W 52/325* (2013.01); *H04W 72/23* (2023.01)

(58) Field of Classification Search
CPC .......................... H04W 52/325; H04W 72/541
See application file for complete search history.

(56) References Cited

U.S. PATENT DOCUMENTS

| 11,553,511 | B2 * | 1/2023 | Bai | H04L 1/0026 |
| 2010/0009689 | A1 * | 1/2010 | Jalloul | H04W 72/542 |
| | | | | 455/450 |
| 2014/0112263 | A1 * | 4/2014 | Lee | H04W 72/0446 |
| | | | | 370/329 |
| 2016/0249302 | A1 * | 8/2016 | Uchiyama | H04W 52/243 |
| 2018/0159584 | A1 * | 6/2018 | Zhang | H04L 5/14 |
| 2018/0254797 | A1 * | 9/2018 | Amini | H04W 72/0446 |
| 2018/0323887 | A1 * | 11/2018 | Azarian Yazdi | H04W 24/08 |
| 2021/0021399 | A1 * | 1/2021 | Liu | H04L 1/0003 |
| 2022/0094490 | A1 * | 3/2022 | Yang | H04W 72/542 |
| 2022/0182116 | A1 * | 6/2022 | Raghavan | H04B 7/0617 |
| 2022/0248285 | A1 * | 8/2022 | Sagar | H04B 17/345 |

FOREIGN PATENT DOCUMENTS

EP 2923513 B1 * 10/2020 ........... H04B 1/7107

* cited by examiner

*Primary Examiner* — Douglas B Blair
(74) *Attorney, Agent, or Firm* — Schwegman Lundberg & Woessner, P.A.

(57) ABSTRACT

An apparatus for an S-BS includes processing circuitry configured to decode configuration signaling from a plurality of S-UEs. The configuration signaling indicates an interference level at each of the plurality of S-UEs from transmissions of an M-BS. An S-UE is selected based on a comparison of the interference level at each S-UE with an interference threshold of each S-UE. Control signaling is encoded for transmission to the selected S-UE via a small cell access (S-AC) communication link. The control signaling is transmitted during the reception of downlink data from the M-BS via a primary backhaul communication link.

18 Claims, 12 Drawing Sheets

FULL DUPLEX COMMUNICATIONS IN WIRELESS NETWORKS

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, (MulteFire, LTE-U), and fifth-generation (5G) networks including 5G new radio (NR) (or 5G-NR) networks, 5G-LTE networks such as 5G NR unlicensed spectrum (NR-U) networks and other unlicensed networks including Wi-Fi, CBRS (OnGo), etc. Other aspects are directed to systems and methods for hybrid automatic repeat request (HARQ) acknowledgment (HARQ-ACK) feedback for physical downlink shared channel (PDSCH) transmission with early termination. Additional aspects are related to full-duplex (FD) communications in wireless networks (such as NR wireless networks), where the FD communications are used for, e.g., configuring resilient network connections or for other purposes.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) and sixth-generation (6G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE and NR systems in the licensed, as well as unlicensed spectrum, is expected in future releases and 5G, 6G, and beyond systems. Such enhanced operations can include techniques for HARQ-ACK feedback for PDSCH transmission with early termination. Additional aspects are related to FD communications in wireless networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
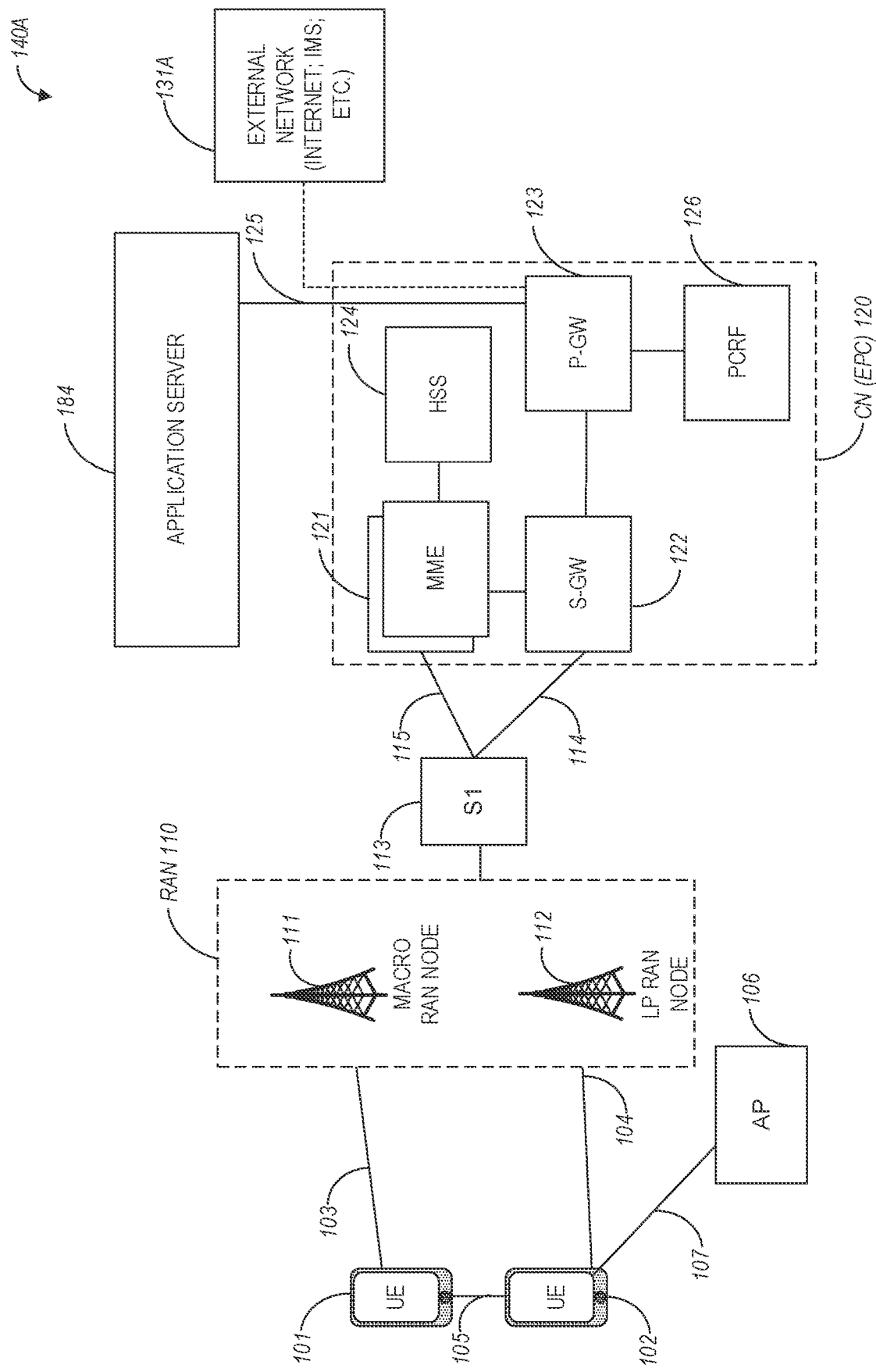
FIG. 1A illustrates an exemplary architecture of a network, in accordance with some aspects.

FIG. 1A illustrates an exemplary architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112 or an unlicensed spectrum based secondary RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries user traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

Figure 1B:
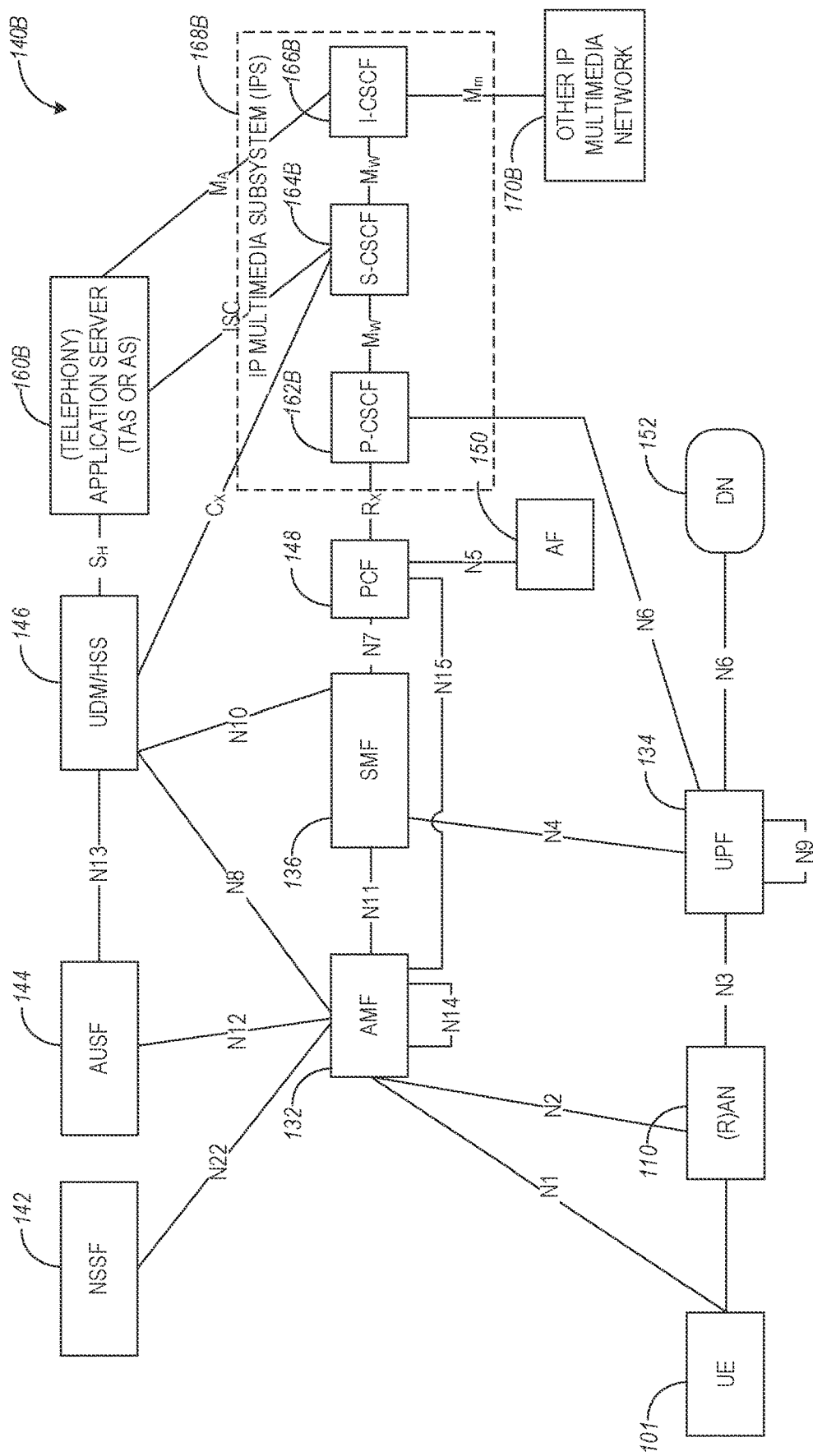
FIG. 1B and FIG. 1C illustrate a non-roaming 5G (and beyond) system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
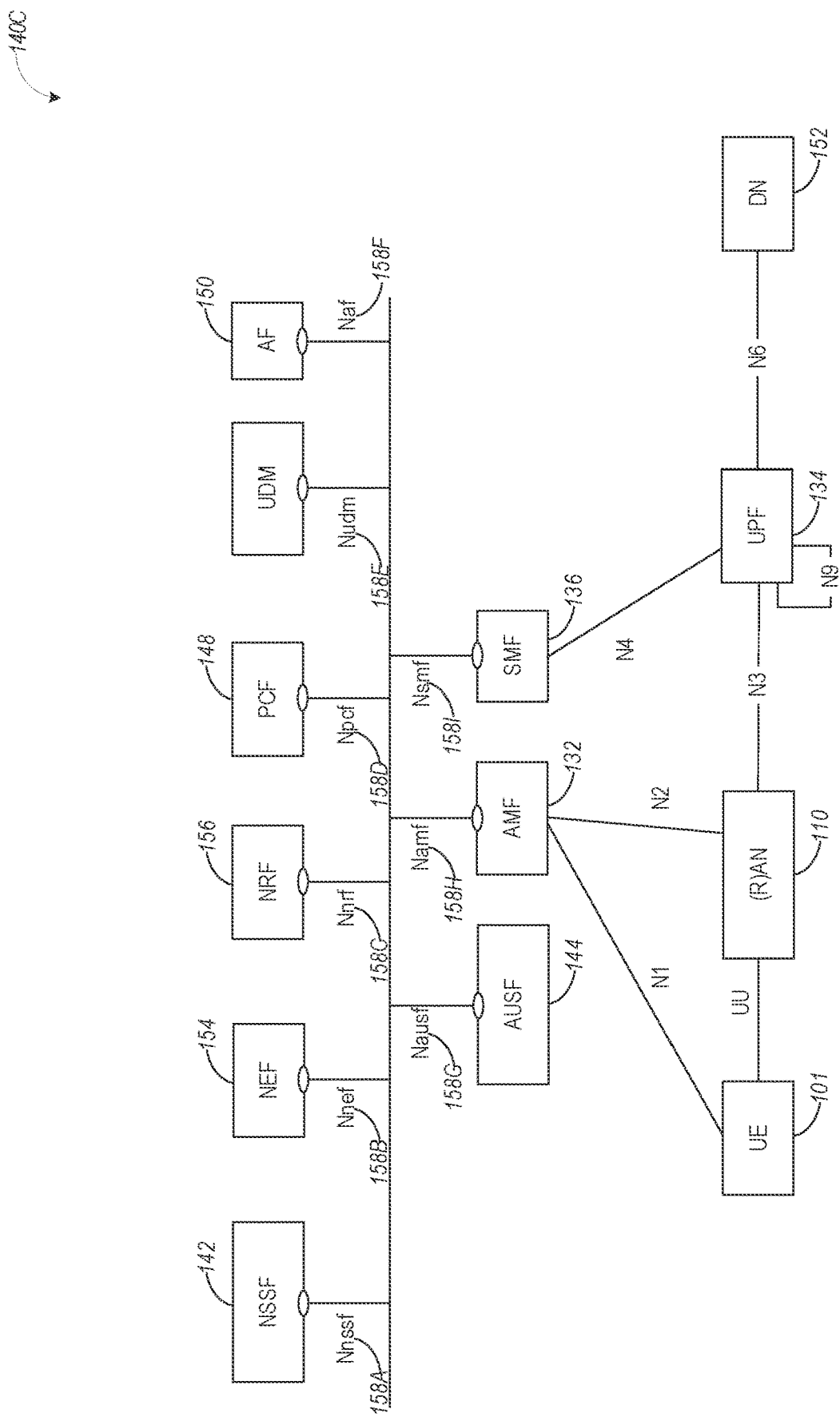

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Figure 2:
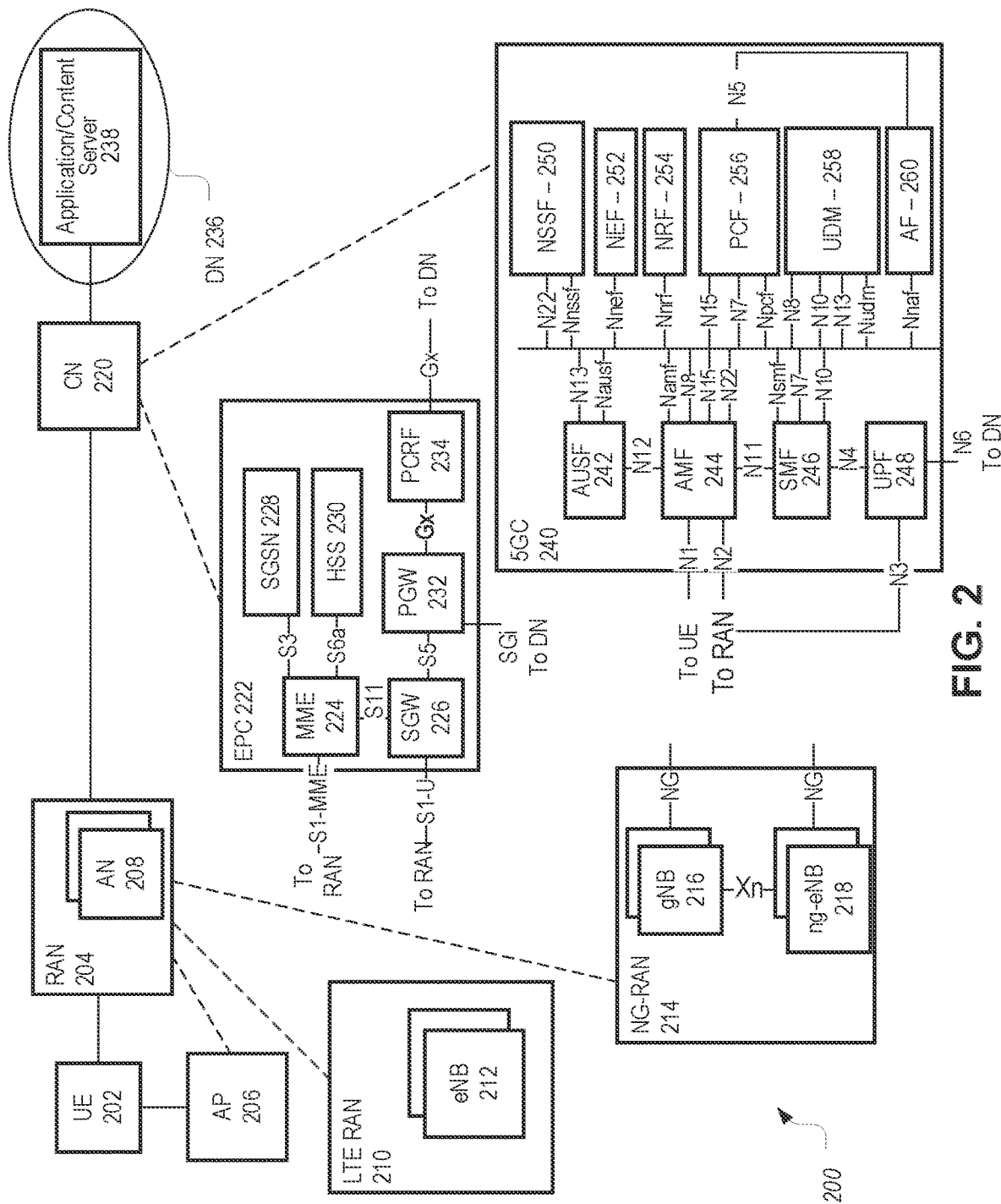
FIG. 2, FIG. 3, and FIG. 4 illustrate various systems, devices, and components that may implement aspects of disclosed embodiments.
Figure 3:
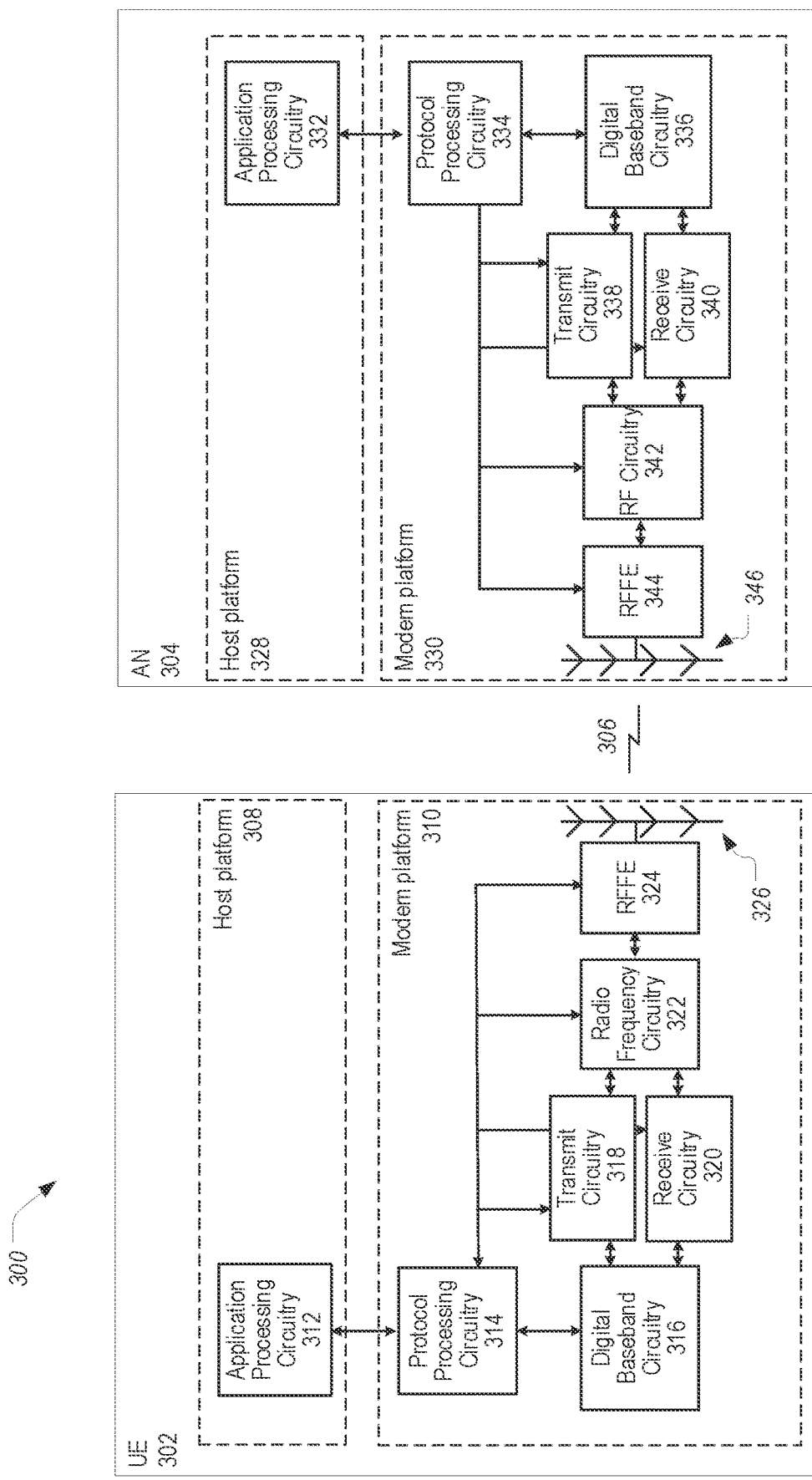
Figure 4:
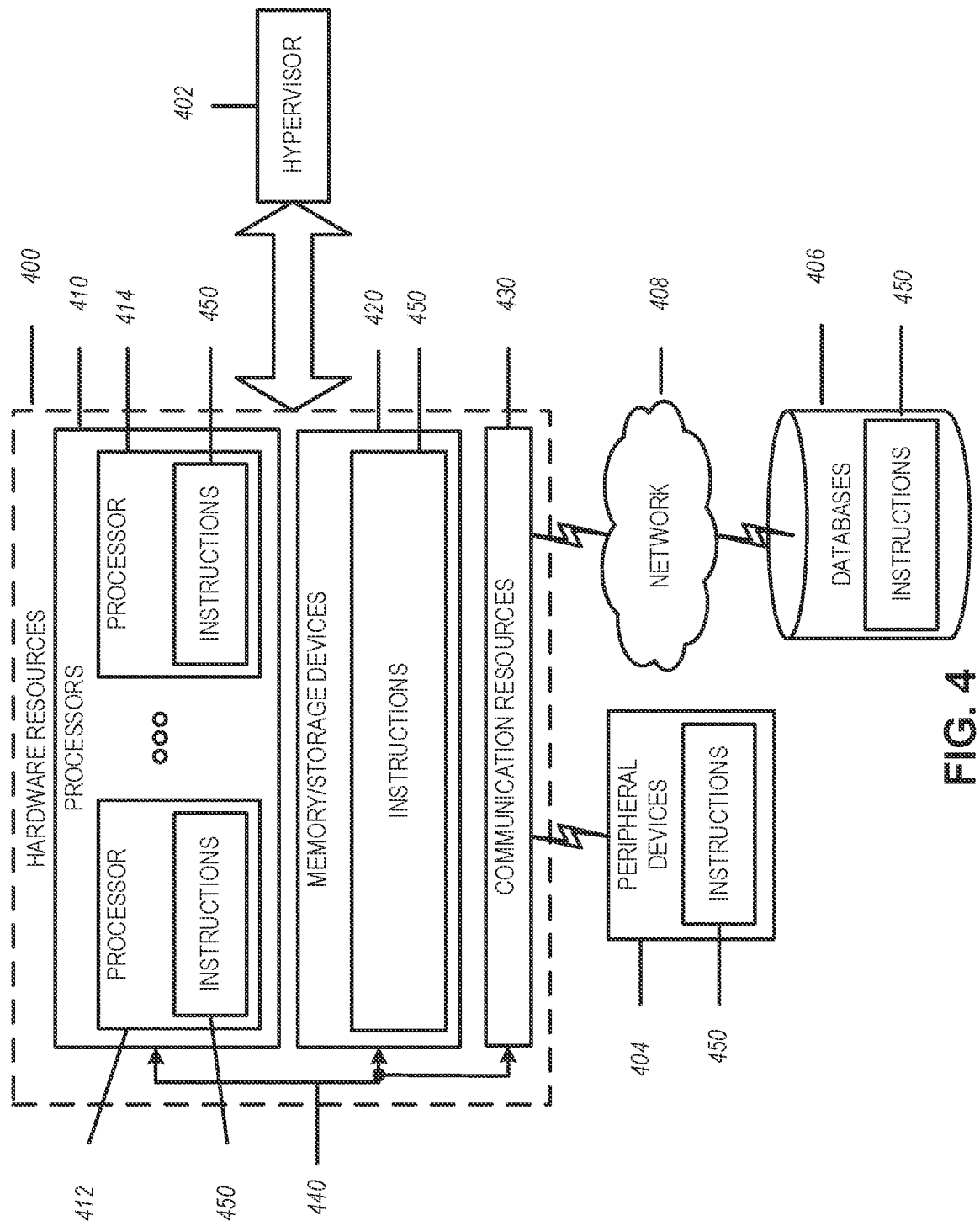

FIG. 2, FIG. 3, and FIG. 4 illustrate various systems, devices, and components that may implement aspects of disclosed embodiments.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computing device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high-speed events, such as crash avoidance, traffic warnings, and the like. Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL); turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS. PDSCH/PDCCH DMRS similar to the LTE air interface. The 5G-NR air interface may not use a CRS but may use PBCH DMRS for PBCH demodulation; PTRS for phase tracking for PDSCH and tracking reference signal for time tracking. The 5G-NR air interface may operate on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 that includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of the Enhanced Packet System (EPS) 222, which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an S1 interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable the transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 220 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 222. The PCRF 234 may be communicatively coupled to the app/content server 238 to determine appropriate QoS and charging parameters for service flows. The PCRF 234 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating. UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NSSAIs if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs, or used for other purposes such as analytics. Additionally, the NEF 252 may exhibit a Nnef service-based interface.

The NRF 254 may support service discovery functions, receive NF discovery requests from NF instances, and provide the information of the discovered NF instances to the NF instances. NRF 254 also maintains information on available NF instances and their supported services. As used herein, the terms "instantiate," "instantiation," and the like may refer to the creation of an instance, and an "instance" may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant for policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store the subscription data of UE 202. For example, subscription data may be communicated via an N8 reference point between the UDM 258 and the AMF 244. The UDM 258 may include two parts, an application front end, and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR 221 to allow the UDM 258, PCF 256, and NEF 252 to access a particular set of the stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

FIG. 3 schematically illustrates a wireless network 300 in accordance with various embodiments. The wireless network 300 may include a UE 302 in wireless communication with AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more layer operations to facilitate transmission or reception of data over the connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether the communication is TDM or FDM, in mmWave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 302 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 304 may perform various logical functions that include, for example, RNC functions such as radio bearer management, uplink and downlink dynamic radio resource management, and data packet scheduling.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/subslices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

For one or more embodiments, at least one of the components outlined in one or more of the preceding figures may be configured to perform one or more operations, techniques, processes, and/or methods as outlined in the example sections below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The term "application" may refer to a complete and deployable package, environment to achieve a certain function in an operational environment. The term "AI/ML application" or the like may be an application that contains some artificial intelligence (AI)/machine learning (ML) models and application-level descriptions. In some embodiments, an AI/ML application may be used for configuring or implementing one or more of the disclosed aspects.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML-host informs the actor about the output of the ML algorithm, and the actor decides for an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Advancements in self-interference cancellation enable opportunities for full-duplex (FD) communication. The capability to listen while transmitting can offer fast network recovery for resilient communication. With full-duplex capability, a self-backhaul small cell base station can simultaneously communicate with both a macro base station (M-BS) and a small cell UE. In some aspects. FD capability may be utilized to opportunistically transmit assisting control information to enhance the network resilience by enabling BS/UE to promptly adapt to channel/traffic variation. By utilizing the full-duplex capability to transmit a secondary control signaling, the following improvements may be achieved: 1) improve the reliability of control messages via duplicate transmission, 2) reduce the amount of time-frequency resource allocated for primary control signaling since secondary control signals can be used to ensure the same reliability, and 3) facilitate fast RAN parameters update such as fast link adaptation, early HARQ, MIMO codebook/beam selection update, radio resource management (RRM) messages, etc. In addition, advanced interference management algorithms such as frequency resource allocation, scheduling, and adaptive uplink power control can also be applied to improve network resilience and network spectral efficiency in full-duplex wireless systems. The disclosed techniques may be applied to multi-hop or Resilient & Intelligent NextG Systems (RINGS) control network (RCN). Secondary control signaling enabled by FD can allow the RCN to monitor for possible Fault-Attack-Failure-Outage (FAFO) events that might affect the production network but not the RCN due to its resiliency-by-design hardening. FD operation may be extended to network slices where for example, under the control of the network operator, a network slice could be dedicated to RCN operation to improve overall network resiliency. This capability opens possibilities for efficient (low cost) wireless network virtualization and distributed bridging and routing across virtualized wireless networks without the single point of failure and bandwidth bottlenecks at macro base stations; also furthering the possibilities for fusing wireless and wired virtual networks in the far edge.

Existing backhaul-capable (e.g., self-backhaul) small cells operate in a half-duplex manner where transmission and reception should be orthogonal in either time or frequency domain. Therefore, both data and control signal transmission needs to follow the half-duplex constraint and it requires careful resource allocation to ensure all downlink (DL) and uplink (UL) backhaul and small cell access are orthogonal to each other.

For half-duplex self-backhaul, the resource allocation for DL/UL backhaul links and self-backhaul small-cell access links is typically static or changing at a slow rate due to the signaling overhead and network coordination complexity. As a result, resource allocation may not be the most efficient. Some control signaling requires periodic transmission which may result in frequent switching among DL/UL backhaul and access links for a small cell and further reduce resource utilization efficiency for data transmission. Previous solutions do not consider self-backhaul small cells with full-duplex capability and do not explore how to exploit full-duplex for secondary control signaling transmission to enhance control signal reliability and to reduce half-duplex control signal transmission frequency.

The disclosed techniques leverage full-duplex capability enabled by self-interference cancellation to send/receive control signaling via secondary transmission direction while receiving/sending data over the primary transmission direction. In addition, the disclosed techniques include advanced interference management and resource allocation mechanisms, including scheduling strategies for backhaul-capable small cells, adaptive UE power control schemes, and frequency planning to further enhance the spectrum utilization efficiency for full-duplex transmission, thus enabling a more resilient network. The disclosed techniques may be also be utilized to do load balancing at some point of more important traffic into the more reliable capable channels. Concepts around network slicing connected in the different resource allocation and interference management may be used as well as part of the quality of service management, e.g., having a dedicated full-duplex slice for the RINGS Control Network (RCN) to improve network resiliency by being able to exchange in an optimized manner, e.g., with reduced latency or increased throughput, relevant properties between the different components of the wireless network. For example, the RCN slice may discover, authenticate, and establish connectivity context for roaming nodes equipped with RCN support independent of normal roaming, onboarding and connectivity functions. If FAFO events occur, the RCN may utilize any available node, including nodes not normally connected.

Secondary control links enabled by FD capability can allow timely configuration adaptation to a time-varying wireless environment. FD also allows more aggressive use of the spectrum to realize more efficient radio usage. This capability can also help future 6G networks requiring ultra-resiliency to quickly adapt to any changes in the network. In this regard, even though functionalities associated with FIGS. 1A-4 are discussed in the context of 5G communications, such functionalities associated with FIGS. 1A-4, as well as the disclosed techniques, may apply to 6G communication systems (and beyond).

The present disclosure describes the concept for FD-enabled assistance control signaling for FD self-backhaul small cells. The present disclosure also describes three resource management and interference management techniques to further improve the spectrum efficiency for FD systems: resource allocation and scheduling algorithms in full-duplex self-backhaul small cell networks; UE power control strategies in FD systems; and inter-cell interference coordination for full-duplex systems.

In some aspects, coding strategies, such as turbo coding, can be applied on top of the full-duplex transmission to further enhance spectral efficiency. In the case of operating with multiple network slices, each slice could operate with a different level of Forward Error Correction (FEC) to protect the data exchanged.

Enhanced Control Signaling for Full-Duplex Self-Backhaul Small Cells

The present disclosure discusses criteria and link selection rules to opportunistically transmit control messages via FD. The present disclosure also discusses what type of control signals may be transmitted in FD to improve overall system performance.

Figure 5:
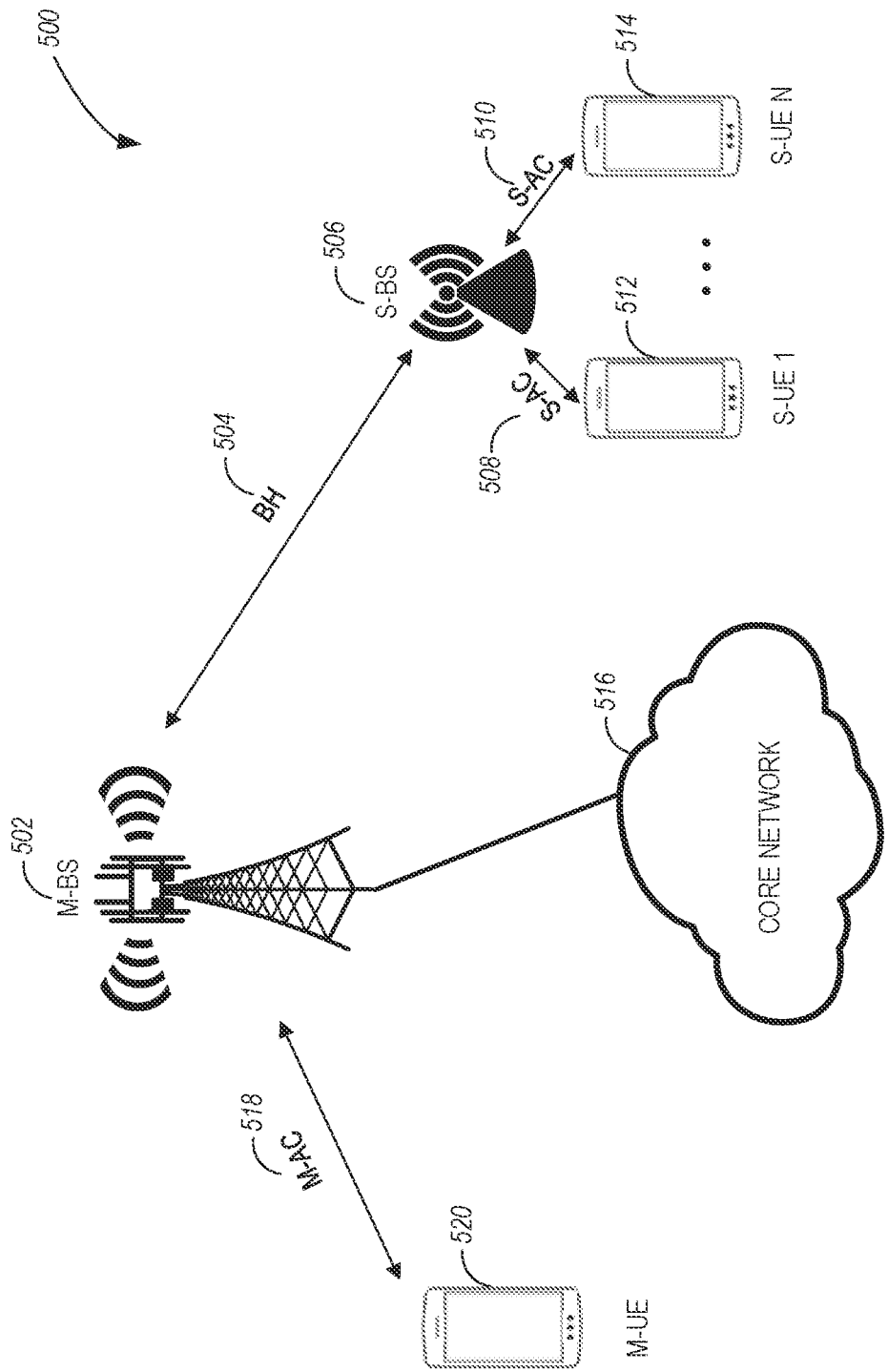
FIG. 5 illustrates network elements in a radio access network with self-backhaul small cells, according to some example embodiments.

Criteria and Link Selection Rules to Opportunistically Transmit Control Messages Via FD FIG. 5 illustrates network elements in a radio access network (RAN) with backhaul-capable small cells (e.g., self-backhaul small cells), according to some example embodiments. Referring to FIG. 5, RAN 500 includes a macro cell base station (M-BS) 502 in communication with the core network 516 and a macro cell UE (M-UE) 520 via macro cell access (M-AC) link 518. The M-BS 502 is also in communication with small cell base stations (S-BSs) such as S-BS 506 via a backhaul link 504. The S-BS 506 may communicate with small cell user equipments (S-UEs) 512, . . . , 514 via corresponding small cell access (S-AC) links 508, . . . , 510.

M-BSs provide both M-AC connections for M-UEs and backhaul (BH) connections for self-backhaul S-BSs. An S-BS provides S-AC connections for S-UEs.

In some aspects, for conventional half-duplex S-BS, orthogonal time-frequency resource will be allocated for backhaul (BH) downlink (DL), BH uplink (UL), S-AC DL, and S-AC UL transmission. The transmit direction assigned for half-duplex transmission may be referred to as the primary data and control link, or primary link. In some embodiments, with full-duplex capability, S-BS can utilize the other transmit direction, which was originally muted due to half-duplex transceiver constraint, as secondary control link. To protect the transmission of the primary link, power control can be applied to secondary control links. In addition, in some aspects, a secondary control link can use the lowest modulation and coding scheme (MCS) and extra repetition coding to compensate for power loss and interference from the primary link.

The possible secondary links for corresponding primary data and control links are summarized in Table 1 below.

TABLE 1

| Primary data & control link | BH DL | BH UL | S-AC DL | S-AD UL |
|---|---|---|---|---|
| Potential secondary control links | BH UL<br>S-AC DL | BH DL<br>S-AC UL | BH DL<br>S-AC UL | BH UL<br>S-AC DL |

The disclosed techniques can further be extended to a multi-hop network or a wireless RCN, whereas the pairing of primary links and potential secondary control link can be found by replacing BH links with the odd-th order of hop(s) and S-AC links with the even-th order of hop(s) in the above table. When an RCN is available, the additional nodes, some of which may not be normally connected to the production network, can be included in a primary/secondary control link table that is dedicated to resiliency functions. Consequently, resiliency goals can be achieved both for normal workloads where a secondary control link is maintained and for resiliency recovery capabilities that focus on network recovery post FAFO event.

For the scenarios where primary links are for BH DL and UL and corresponding secondary links are for BH UL and DL, respectively, it requires the anchor M-BS also has the full-duplex capability. The criteria for allowing secondary control channel transmission is:

1) The self-interference from the transmission of the primary signal can be canceled to a level such that reception of the secondary control signal can be decoded at the lowest MCS level; and 2) The secondary control signal can be transmitted at a reduced power level such that:

a) after self-interference cancellation (SIC), the echo has no impact on decoding for the primary signal reception, and b) after transmitting power reduction, sufficiently high received SINR can be guaranteed for decoding the secondary control signal at the lowest MCS level.

For the remaining four scenarios (excluding the scenarios with S-AC DL and UL as the primary links and S-AC UL and DL as the corresponding secondary control links), in addition to the SIC consideration, the issue of cross-tier interference also affects whether the secondary control links can be scheduled or not. In the following disclosure, it is assumed the SIC criteria 1) and 2) described above are already satisfied and the disclosure discusses how to identify candidate DL and UL S-UEs qualified for secondary-control transmission.

Table 2 below summarizes the qualification criteria for secondary control. $I_{A \to B}$ denotes the interference level from A to B based on a typical primary transmission power setting, where A and B can be M-BS or S-UE. The power scaling factors for secondary control transmission of M-BS and UE are denoted as $\alpha_{M\text{-}BS}$ and $\alpha_{UE}$, respectively. Tolerable interference thresholds for decoding primary links for S-UE and M-BS are denoted as $TH_{S\text{-}UE}$ and $TH_{M\text{-}BS}$, respectively. Tolerable interference thresholds for decoding secondary control at minimum MCS level for S-UE and M-BS are denoted as $TH_{S\text{-}UE, MCS\_min}$ and $TH_{M\text{-}BS, MCS\_min}$, respectively. The threshold may need to be adjusted based on the level of inter-cell interference from neighboring macro cells or small cells.

TABLE 2

| | Primary | Secondary control | Qualification criteria for secondary control |
|---|---|---|---|
| Case A | BH DL | S-ACDL | DL S-UE with $I_{M\text{-}BS \to S\text{-}UE} < TH_{S\text{-}UE, MCS\_min}$ |
| Case B | S-AC UL | BH UL | UL S-UE with $I_{S\text{-}UE \to M\text{-}BS} < TH_{M\text{-}BS, MCS\_min}$ |
| Case C | BH UL | S-AC UL | UL S-UE with $\alpha_{UE} \cdot I_{S\text{-}UE \to M\text{-}BS} < TH_{M\text{-}BS}$ |
| Case D | S-AC DL | BH DL | DL S-UE with $\alpha_{M\text{-}BS} \cdot I_{M\text{-}BS \to S\text{-}UE} < TH_{S\text{-}UE}$ |

Case A: The Primary Link is the BH DL and the Secondary Control Link is the S-AC DL.

In this case, the primary BH DL link can cause cross-tier interference to the DL S-UE. Thus, based on the cross-tier interference level observed by the DL S-UE, the DL S-UE may be classified into two groups: qualified UE for secondary control and disqualified UE for secondary control. If the cross-tier interference is below a threshold that, with high probability, secondary-control sent at lowest MCS can be correctly decoded for a DL S-UE, this UE is qualified for secondary-control and can be scheduled for secondary control transmission during primary DL BH transmission while a disqualified UE cannot.

Case B: The Primary Link is the S-AC UL and the Secondary Control Link is the BH UL.

In this case, the UL S-UE scheduled for primary S-AC UL can cause interference to M-BS receiving secondary UL control. The UL S-UE can be classified into two groups based on the interference level they caused to M-BS: those who are qualified for joint transmission with secondary control if interference to M-BS is low, and those who are disqualified if interference to M-BS is high. The threshold for determining whether the interference is high or low is the maximum interference M-BS can tolerate for decoding secondary control sent at minimum MCS level. S-BS can only schedule secondary UL BH control messages within the UL resource blocks assigned to a qualified UL S-UE. In some aspects, the M-BS may reuse the S-AC UL resource for M-AC UL or BH UL for a different S-BS. Therefore, an S-BS may be aware of M-BS resource availability while attempting to transmit secondary control in BH UL. It can be achieved by the M-BS indicating BH UL secondary control friendly zone to each S-BS or by S-BS deciphering all previous M-BS UL grant messages.

Case C: The Primary Link is the BH UL and the Secondary Control Link is the S-AC UL.

In this case, the secondary S-AC UL control link can cause interference to the M-BS receiving the primary UL BH signal. The UL S-UE can reduce the transmit power for the secondary control to reduce interference to M-BS. However, the S-UE may ensure that transmit power is sufficiently high for achieving good SINR at S-BS to decode the control signal. Depending on the interference level to M-BS after power scaling, the UL S-UE may be classified into qualified secondary UE and disqualified UE. A qualified S-UE generates cross-tier interference lower than a tolerable interference threshold which is selected depending on M-BS primary signal reception at MBS. Only a qualified S-UE can be scheduled to transmit secondary control during primary UL BH transmission. The S-BS can signal the qualified S-UE for secondary UL control once it received the UL BH grant from the M-BS.

Case D: The Primary Link is the S-AC DL and the Secondary Control Link is the BH DL.

In this case, the M-BS transmitting secondary BH DL control can cause interference to the S-UE scheduled to receive the DL signal. The M-BS can also reduce the transmit power for secondary control, but the power may at least be high enough for the control message sent at the lowest MCS level to be correctly decoded. Depending on the cross-tier interference observed by the S-UE, the S-UE can be classified into two groups: those who are qualified for joint transmission with secondary BH control and those who are disqualified. An S-UE is qualified if the observed interference from M-BS is so low that there is only limited degradation on primary signal decoding. The M-BS can only schedule BH DL secondary control when the qualified S-UE is scheduled for the S-AC DL. This can be achieved by the S-BS informing the M-BS of its DL scheduling assignment in advance or by M-BS and S-BS negotiating a DL BH secondary control friendly zone where the S-BS can only schedule a qualified S-UE for the S-AC DL.

Example control signals that can be used in FD secondary control signaling are discussed herein below.

In some embodiments, the control signaling can include signaling for channel quality (CQI). UL secondary control link can be used for transmission of CQI feedback that informs the M-BS, S-BS, DL BH, or S-AC link quality. This can enable fast link adaptation in a TDD system or TDM type of BH/AC resource partitioning. In a TDD system or TDM type of BH/AC resource partitioning, primary UL control needs to wait for the allocated time slots for transmission, and sometimes the latency may impact CQI accuracy for future transmission. An example is assuming the resource allocation for BH/S-AC DL/UL is partitioned in time and the transmission sequence is arranged in the following order: BH DL→BH UL→S-AC DL→S-AC UL→BH DL and so on. Without secondary control, CQI for BH DL is transmitted during the BH UL interval and needs to wait until the next BH DL interval to update MCS based on the CQI update. With the secondary control channel enabled by self-interference cancelation, BH DL CQI can be transmitted during S-AC UL interval resulting in a better MCS and scheduling assignment for BH DL based on more up-to-date CQI feedback. In an FDD system or FDM type of BH/AC resource partitioning, the secondary CQI feedback can be used to enhance CQI accuracy or to reduce the amount of resource to be allocated in primary links for CQI feedback.

Some network configurations may require the S-BS to inform the M-BS of the S-AC DL/UL link quality for better network radio resource management and flow control. In this case, the S-BS can also utilize the secondary UL BH control channel to transmit S-AC link quality information.

In some embodiments, the control signaling can include one or more reference signals for channel estimation (e.g., CRS or SRS). The UL secondary control link can also be used to transmit SRS to help the M-BS or the S-BS estimate the channel quality of UL BH or S-AC links. The DL secondary control link can be used to transmit a CRS to help the S-BS or the S-UE measure reference signal received power (RSRP) and reference signal received quality (RSRQ). In some aspects, the transmission of reference signals on a secondary control link can be used to improve channel estimation reliability or to enable fast link adaptation. Additional RSRP measurement at the S-UE can help handover performance as well.

In a communication system with massive antennas, overhead to monitor the link quality of all possible beam directions can be high. Secondary reference signal transmission can be used as a means to monitor more possible beam directions and improve MIMO system performance.

In some embodiments, the control signaling can include MIMO precoding matrix indicator (PMI) and rank indicator (RI). The UL secondary control link can be used to feedback the PMI and RI selected by the S-UE or the S-BS. With the secondary control link, the reliability of the PMI and the RI feedback may be improved. In addition, in TDD or TDM type of BH/S-AC resource partitioning, the secondary control link can help the M-BS or the S-BS to timely adjust beam direction and MIMO transmission strategy based on the feedback.

In some embodiments, the control signaling can include signaling for the UL scheduling grant. The DL secondary control link can be used to transmit UL scheduling grant information. This can be useful for supporting ultra-low latency applications with self-backhaul small cells. It is generally harder for self-backhaul small cells to meet the latency requirement for ultra-low latency applications since data and control signals are transmitted over additional hop(s). The secondary control channel can be used to reduce the latency from control overhead. By allowing the UL grant transmitted on secondary control links, a UL transmission of data requiring ultra-low latency can be scheduled to be transmitted earlier.

In some embodiments, the control signaling can include hybrid automatic repeat request (HARQ) acknowledgment (ACK/NAK). The secondary control link can also be used to transmit ACK/NAK for HARQ. In a TDD system or TDM type of BH/S-AC resource partitioning, the secondary control link can enable fast HARQ feedback. In some aspects, when a NAK is received via secondary control link, re-transmission can be triggered earlier.

In some embodiments, the control signaling can include buffer status update for flow control. The S-BS can also utilize the secondary UL BH control channel to provide S-AC buffer status information to the M-BS for flow control. The M-BS can adjust its scheduling decision accordingly. For example, if congestion is observed at the S-AC DL, the M-BS can allocate more resources for M-AC to achieve better spectrum utilization efficiency.

In some embodiments, the control signaling can include radio resource management (RRM) messages. Deployment of self-backhaul small cells introduces more communication links in the network making the interference environment more complicated and the radio resource management more challenging. The issue can be more complicated if a mesh network is formed based on self-backhaul technology. With self-interference cancellation capability, self-backhaul S-BS can utilize a secondary control channel to communicate RRM messages. With secondary control links, more RRM messages can be exchanged and it will take a shorter time to change radio resource allocation configuration achieving an agile network. In addition, S-BS will be able to sense interference environments even during transmission. The extra sensing capability can be used to provide recommendations in RRM messages.

In some embodiments, the control signaling can include messages containing telemetry data. The secondary control link can be used to transmit telemetry data, such as wireless channel quality. The telemetry data can be used to help assess the quality of full-duplex links and help determine the self-interference cancellation requirements.

In some embodiments, the control signaling can include messages containing quality of service requirements and network slicing. The UE devices connect to a particular small cell or BS may provide quality of service requirements that are needed for a particular connection to perform a particular action. For instance, a drone needs to drop certain critical information within a given latency SLO. The architecture may be capable to set the right level of interferences and power to be sure that the UE can achieve the required quality of service.

Similarly, different network slicing schemes could be included as part of this negotiation. Different slices provided within the various access points may have different dynamic requirements and associated service level agreements. This processing may be used to establish the baseline on the various channels that are mapped into the various access and determine the interference level and quality of service depending on the actual traffic that is seen across each of the slices in each of the access (BS and small cells) and the actual priority associated to each slide.

The network operator or IT manager for a private network will inform the radio, e.g., the gNB for 5G networks or the self-backhaul small-cell which slices of the network operate under full-duplex mode and which ones operate under half-duplex mode to have self-interference cancellation be properly applied to the correct slices. There may be some constraints to live by with this mode of operation, e.g., the tolerance level for self-interference for a half-duplex slice will place some constraints for activating full-duplex mode for a full-duplex slice.

In some embodiments, the control signaling can include signaling for RCN-capable operations in either full-duplex, half-duplex and concurrent operation with operational workloads versus post FAFO event operation.

Extension to Scenarios with Different Transceiver Enhancements

The concept of secondary control signaling can also apply to scenarios with different types of transceiver enhancements. For example, if the M-BS/S-BS/S-UE supports non-orthogonal-multiple-access (NOMA), the S-BS may simultaneously transmit to the M-BS and the S-UE, or simultaneously receive from the M-BS and the S-UE by separating transmit or receive a signal in the power domain. Another example is when the S-BS has multiple antennas and can simultaneously transmit or receive signals to the M-BS and the S-UE by separating the signals in the spatial domain. For the scenarios where the S-BS can simultaneously transmit to the M-BS and the S-UE, two different types of secondary control signaling usage can be supported:

(1) Primary S-AC DL and secondary BH UL. During the primary S-AC DL resource, the S-BS can opportunistically transmit secondary BH control in the UL if there is sufficient spatial separation or the power differentiation is sufficient to support NOMA when pairing with the current scheduled primary DL S-UE. In some aspects, power control plus extra coding (e.g., repetition code) can be used at the secondary control.

(2) Primary BH UL and secondary S-AC DL. During primary BH UL resource, the S-BS can opportunistically select a DL S-UE, that satisfies either spatial separation requirement with respect to the BH link or power differentiation with regard to the BH, to transmit secondary S-AC DL control signal. In some aspects, power control plus extra coding (e.g., repetition code) can be used at the secondary control.

For the scenario where the S-BS can simultaneously receive from M-BS and S-UE, another two types of secondary control can be supported as follows;

(1) Primary BH DL and secondary S-AC UL. The S-BS can first identify the set of UL S-UEs with sufficient spatial separation with regard to the DL BH link or sufficient power differentiation to support NOMA with DL BH. The S-BS can inform the qualified UL S-UE of the resource that will be allocated for primary BH DL transmission and instruct some of the qualified UL S-UE to transmit secondary control signaling during the primary BH DL resource. In some aspects, the UL S-UE can transmit secondary control with lower power and extra coding.

(2) Primary S-AC UL and secondary BH DL. The S-BS first identifies the set of UL S-UEs with sufficient spatial separation with regard to the DL BH link or sufficient power differentiation to support NOMA with the DL BH. Within the primary S-AC UL resource, there can be secondary BH DL control-friendly resources agreed upon between the M-BS and the S-BS. The S-BS can then choose to schedule the qualified UL S-UE for primary S-AC UL during the secondary BH DL control-friendly resource. Another option is the S-BS can signal its scheduling decision to M-BS so that M-BS is aware of which resource can be utilized for secondary BH DL control.

Enhanced resource management and interference management techniques for FD systems are discussed herein below.

Resource Allocation and Scheduling Algorithms in FD Self-Backhaul Small Cell Networks The disclosed techniques may use two different kinds of resource allocation and scheduling algorithms. The first one is designed when limited-knowledge is available and does not have stringent requirements on backhaul and access coordination. The second one may be based on coordination between backhaul and access links to optimize the network throughput performance.

The backhaul channel (BH) between macro cell to small cell (i.e., anchor eNB to self-backhauled eNB) is denoted as S-BH, the access channel (AC) between macro cell to macro-cell-UE (M-UE who associates with macro-cell) is denoted as M-AC, and the access channel (AC) between small cell to small-cell-UE (S-UE who associates with small cell) is denoted as S-AC. In some aspects, an active UE represents a UE with ongoing traffic and should be considered by a scheduler while making scheduling decisions.

Distributed resource allocation and scheduling algorithms are discussed herein below.

When the anchor eNB and the self-backhauled eNB are loosely coordinated with limited knowledge of small cell S-UE but no exchange of queue and rate information between backhaul and access channels, the following steps may be used to perform distributed resource allocation and scheduling.

Step 1: resource allocation and scheduling for macro access channel (M-AC) and small cell backhaul channel (S-BH). There are two possible scheduling approaches:

(a) The first approach is that the anchor eNB treats each active S-UE as a virtual UE. The scheduling metric for the virtual S-UE can be computed based on UE-specific statistics and backhaul link quality of the serving small cell. While making the scheduling decision, the anchor eNB compares the scheduling metrics for all M-UEs and virtual S-UEs and selects the UE with the best scheduling metric for transmission. If a virtual S-UE is selected, the anchor eNB will assign the resource for backhaul transmission with packets belonging to the S-UE.

(b) The second approach is that the anchor eNB treats each small cell as a super M-UE with a single scheduling metric. This approach requires less memory and computing power but requires proper scaling of backhaul scheduling metrics to account for fairness between M-UE and S-UE. First anchor eNB will perform dynamic resource allocation and scheduling between M-AC and S-BH to serve M-UE and self-backhauled eNB. When allocating the time-frequency resources, i.e., resource block (RB), an enhanced scheduling metric is used to account for fairness between small cells and M-UEs. Based on channel state information (CSI) feedback from each associated active M-UE and small cell with active S-UE, the corresponding scheduling metric will be computed. However, for small cells, the scheduling metric may be adjusted. Essentially, a macro cell will treat each small cell as a super M-UE, whose scheduling metric will be scaled according to its associated active S-UEs. Below are some examples of how to adjust the scheduling metric.

(b.1) If the scheduling metric is a function of past throughput, e.g., the proportional-fair scheduling metric, the past throughput for the backhaul link of a small cell should be normalized according to the number of S-UE served by the small cell to ensure fairness between S-UE and M-UE. A simple normalization method for the proportional-fair scheduler is to multiply the small cell scheduling metric computed by the original formula with the number of active S-UE served by the small cell.

(b.2) If the scheduling metric is a function of queue length, the queue length for a small cell may be adjusted based on its serving S-UE. For example, an averaged queue length of each S-UE served by the small cell can be used while computing the scheduling metric (this is equivalent to dividing the queue length of the small cell by the number of its serving S-UEs). If a small cell has been selected, the anchor eNB may decide which S-UE will receive/transmit traffic from/to its associated small cell's backhaul. Since there is limited knowledge exchange between a macro cell and a small cell, for fairness, the anchor eNB will treat each associated S-UE equally. Hence the anchor eNB can: i) use the round-robin method to send/receive the backhaul traffic to/from current active S-UEs who are associated with the selected/scheduled small cell; or ii) send/receive the aggregated backhaul traffic to/from all the active S-UEs who are associated with the selected small cell. The aggregated backhaul traffic can be equally weighted sum traffic from all the active S-UEs.

Step 2: scheduling for a small-cell access channel (S-AC). When anchor eNB is performing Step 1, FD self-backhauled eNB can simultaneously perform scheduling in S-AC for S-UEs, which is independent of Step 1. For example, using a fairness scheduler such as proportional-fairness (PF) scheduler, the FD self-backhauled eNB will compute the PF metric for each associated active S-UE whose traffic has already been transmitted from macro-cell to small cell and queued at small cell. The self-backhauled eNB will select the S-UE with the highest PF metric to serve.

Coordinated resource allocation and scheduling algorithms are discussed hereinbelow.

When an anchor eNB and a self-backhauled eNB have tight coordination and exchange queue and rate information between backhaul and access channels, a jointly coordinated resource allocation and scheduling algorithm may be used to optimize network performance. In some aspects, a fairness-based scheduling algorithm may be used, in particular, proportional-fairness (PF), which is used as a scheduling metric.

In the following description, the coordinated resource allocation and scheduling optimization problem is formulated, and the analysis along with the proposed algorithms is provided.

Problem formulation: The joint resource allocation and proportional-fairness scheduling algorithm for backhaul and access channels are to maximize the sum logarithm throughput of the FD self-backhaul small cell system. Hence an objective is to maximize the following utility function to achieve the best PF performance: max $\Sigma_{k \in K} \log(R_k(t))$, (1), where K represents all the UEs in the network, including all M-UEs and S-UEs, and $R_k(t)$ represents the k-th UE's long-term average rate, i.e., throughput.

Without loss of generality, it may be assumed $K_M$ represents the set of active M-UEs and $K_S$ the set of S-UEs within the coverage range of each macro-cell. All the M-UEs are served by one or more macrocells while the S-UEs are served by total L FD self-backhauled small cells. Hence $K = K_M \cup K_S$.

Equation (1) is also equivalent to the following equation (2) for a PF scheduler:

$$\max \sum_{k \in K} \alpha_k r_k(t),$$

where $\alpha_k = \frac{1}{R_k(t)}$.

where $r_k(t)$ denotes instantaneous rate for k-th UE. Parameter $\alpha_k$ is the inverse of the average rate for the k-th UE, which can be initialized using long-term channel statistics/report, such as wide-band signal-to-interference-over noise ratio or wide-band CQI value (channel quality indicator).

Two binary variables may be used as the scheduling indicators for M-UE and S-UE in each RB, denoted as $\rho_{M,k}^n$ and $\rho_{S,k}^n$, respectively, where $\rho_{M,k}^n$ indicates whether k-th M-UE is scheduled by the macro cell in n-th RB or not, and $\rho_{S,k}^n$ indicates whether k-th S-UE is scheduled by the small cell in n-th RB or not, assuming there are total N RBs, $n \in N$.

Now $r_k(t)$ may be represented as follows:

$$r_k(t) = \begin{cases} \sum_{n=1}^{N} \rho_{M,k}^n r_{M,k}^n, & \text{when } k \in K_M \\ \sum_{n=1}^{N} \rho_{S,k}^n r_{S,k}^n, & \text{when } k \in K_S \end{cases} \quad (3)$$

The above equation may be subject to the following constraints: $\Sigma_{k \in K_M} \rho_{M,k}^n \leq 1$, $\rho_{M,k}^n \in \{0,1\}$, $\forall n$ and $\Sigma_{k \in K_S} \rho_{S,k}^n \leq 1$, $\rho_{S,k}^n \in \{0,1\}$, $\forall n$.

The constraint on $\rho_{M,k}^n$ and $\rho_{S,k}^n$ is because in each RB, at most only one M-UE and S-UE can be scheduled.

In the following description, for ease of notation, time index t may be dropped in the expression.

Equation (3) may be substituted into (1) to obtain the following equivalent objective function:

$$\max_{\rho} \sum_{n=1}^{N} \sum_{k \in K_M} \alpha_k \rho_{M,k}^n r_{M,k}^n + \sum_{n=1}^{N} \sum_{k \in K_S} \alpha_k \rho_{S,k}^n r_{S,k}^n, \quad (4)$$

Next, a backhaul constraint is imposed to ensure that the overall data traffic transmitted over small cell access channel is upper bounded by the total data traffic sent over the backhaul channel, obtaining the following equation:

$$R_{S-AC} \triangleq \sum_{n=1}^{N} \sum_{k \in K_S} \rho_{S,k}^n r_{S,k}^n \leq \sum_{n=1}^{N} \left(1 - \sum_{k \in K_M} \rho_{M,k}^n\right) r_{M,S}^n \triangleq R_{S-BH}, \quad (5)$$

where $r_{M,S}^n$ represents the instantaneous backhaul rate in the n-th RB.

Lagrangian methods may be applied to derive the optimal scheduling solution by introducing a new variable $\lambda$. By combining (4) and (5), the corresponding Lagrangian function can be obtained as follows:

$$L(\rho, \lambda) = \sum_{n=1}^{N} \sum_{k \in K_M} a_k \rho_{M,k}^n r_{M,k}^n + \sum_{n=1}^{N} \sum_{k \in K_S} a_k \rho_{S,k}^n r_{S,k}^n + \lambda(R_{S-BH} - R_{S-AC}) \quad (6)$$

$$= \sum_{n=1}^{N} \left\{ \sum_{k \in K_{M_l}} \rho_{M,k}^n A_k^n + \sum_{k \in K_{S_l}} \rho_{S,k}^n B_{S_l,k}^n \right\} + \lambda \sum_{n=1}^{N} r_{M,S}^n,$$

where $A_k^n = \alpha_k r_{M,k}^n - \lambda r_{M,S}^n$, $k \in K_M$, $B_k^n = (\alpha_k - \lambda) r_{S,k}^n$, $k \in K_S$.

To maximize the objective function of equation (6), $A_k^n$ and $B_k^n$ may be maximized. Hence the following coordinated algorithm can be performed to achieve optimality:

Step 0: Initialize $R_k(0)$ by initialization schemes for proportional-fair scheduling metric, e.g., throughput approximation based on geometric SINR. Initialize backhaul price variable $\lambda$ at both macro cell and small cell. The initial value can be simply $\lambda=0$ or based on some clever guess, e.g, $\lambda=|K_S|/R_S(0)$, where $|K_S|$ is the number of active S-UEs and $R_S(0)$ is the initial estimation of long-term throughput for the backhaul link between anchor eNB and small cells.

Step 1: implemented at macro-cell for backhaul resource allocation and scheduling. Based on M-UE CSI feedback, a macro cell will first select the M-UE that has the best CQI value, i.e., the $\hat{k}$-th M-UE is selected, where $\hat{k} = \arg_{k \in K_M} \max\{\alpha_k r_{M,k}^n\}$. If the weighted estimate rate for the selected $\hat{k}$-th M-UE is higher than the weighted estimate backhaul rate, then the $\hat{k}$-th M-UE will be scheduled in the n-th RB, i.e., if $\alpha_k r_{M,\hat{k}}^n > \lambda r_{M,S}^n$ set $\rho_{M,\hat{k}}^n = 1$, and $\rho_{M,k}^n = 0$, $\forall k \neq \hat{k}$. Otherwise, the resource will be used for backhaul to transmit/received data to/from a small cell, i.e., set $\rho_{M,k}^n = 0 \forall k \in K_M$.

Step 2: implemented small cell for access scheduling. At the self-backhaul small cell, based on R-UE CSI feedback, the R-UE who has the best CQI value will be selected and scheduled, i.e., the $\hat{k}$-th R-UE is scheduled in the n-th RB, set $\rho_{S,\hat{k}}^n = 1$, and $\rho_{S,k}^n = 0$ $\forall k \neq \hat{k}$, where $\hat{k} = \arg_{k \in K_S} \max\{(\alpha_k - \lambda) r_{S,k}^n\}$.

Step 3: Updating backhaul price $\lambda$ between a macro cell and a small cell. The Lagrangian dual variable $\lambda$ in equation (6) is intuitively representing backhaul price balancing small cell backhaul rate and access rate and can be updated as follows. Based on Step 1 and Step 2, a macro cell and a small cell can update $R_{S-BH}$ and $R_{S-AC}$ according to equation (5).

The backhaul price $\lambda$ may be updated using the sub-gradient method: $\lambda(t+1) = \lambda(t) - \beta(R_{S-BH} - R_{S-AC})$, where $0 \leq \lambda \leq \lambda_{max}$ (7), where $$\lambda_{max} = \max_{k \in K_S} \alpha_k$$

according to equation (6) to ensure $B_k^n \geq 0$. The backhaul price value is upper bounded by the maximum weight of all S-UEs.

After an update of $\lambda$, the above process is repeated until convergence. Additionally, the updated lambda value can be shared with a secondary and/or an identified RCN endpoint for this node such that if a FAFO event occurs, the already optimized lambda value can be used to restart the node to avoid having to re-learn the optimized lambda value.

As a small cell has both $R_{S-BH}$ and $R_{S-AC}$ information, $\lambda$ update can occur locally at small cells. The small cell can signal the updated $\lambda$ value or the step size, $\lambda(t) - \lambda(t-T)$, where T is the update periodicity, to anchor eNB over the backhaul using proprietary signaling or new 5G signaling.

As seen from Step 3, when the backhaul rate is much larger than the access rate, i.e., $R_{S-BH} \gg R_{S-AC}$ the backhaul price $\lambda$ will become small, indicating that more backhaul resources may be allocated to the macro-cell access channel to serve M-UEs, as the backhaul traffic will be bottlenecked by the small-cell access channel and the backhaul resource will be wasted if allocated to the small-cell backhaul channel. On the other hand, if the backhaul rate is much smaller than the access rate, i.e., $R_{S-BH} \ll R_{S-AC}$ the backhaul price $\lambda$ will become larger, indicating that more backhaul resources should be allocated to the small-cell backhaul channel as the backhaul channel now becomes the bottleneck for backhaul traffic.

With the above algorithms, (near)-optimal joint resource allocation and proportional-fairness scheduling decisions may be performed. The proposed algorithms can be applied to a C-RAN structure, with the backhaul resource allocation being performed among multiple small cells instead of small cells and M-UEs. The proposed resource allocation and scheduling algorithms can also be extended to the existing half-duplex or dynamic half-duplex self-backhaul small cell system. The caveat is that the constraints for resource allocation and scheduling need to be adjusted to the half-duplex system requirement. For example, in an FDD self-backhaul system where M-AC and S-AC are in f1, S-BH is in f2. The scheduling constraint for M-UE and S-UE is that the algorithm can be applied only in f1, while for small cell backhaul the algorithm can only be used in f2.

Figure 6:
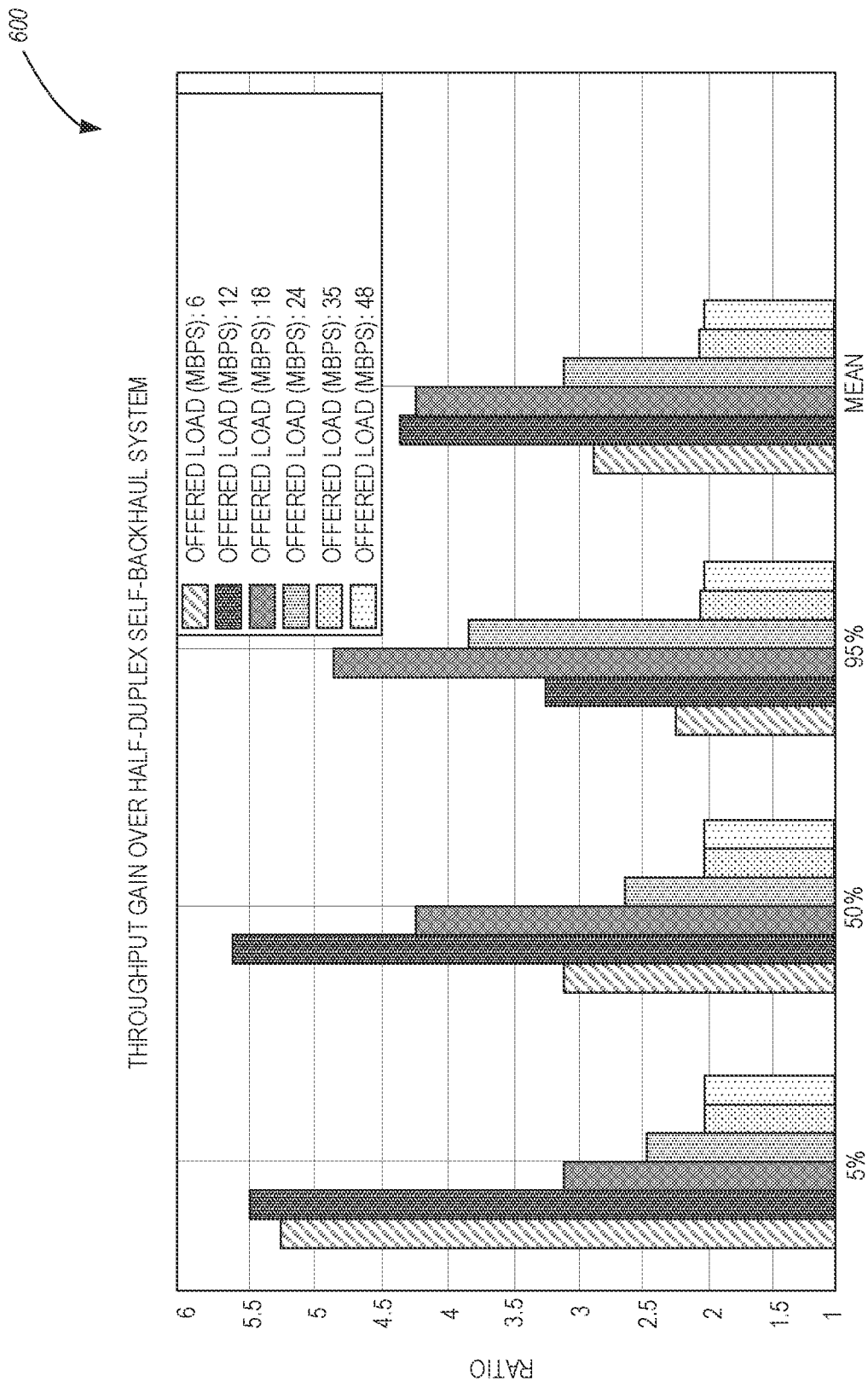
FIG. 6 is a graph of full-duplex self-backhaul small cell performance versus half-duplex counterpart, according to some example embodiments.

FIG. 6 is a graph 600 of full-duplex self-backhaul small cell performance versus half-duplex counterpart, according to some example embodiments. FIG. 6 demonstrates the performance FD self-backhaul small cell system using our proposed resource allocation and scheduling algorithms under loose coordination conditions. The performance is evaluated with fully standardized LTE self-backhaul small cell system-level simulation, where the y-axis represents the throughput gain over an out-of-band FDD self-backhaul system under bursty traffic. It can be noted from FIG. 6 that the proposed algorithms can achieve good performance with varying traffic loads. More than two times FD gain is observed under certain traffic load regimes, because of the significant latency reduction achieved by FD self-backhaul when in the bursty traffic environment.

In summary, the disclosed techniques provide resource allocation and fairness-based scheduling algorithms for different levels of coordination between backhaul and access channels in full-duplex self-backhaul small cell networks. Under different coordination conditions, optimized network performance can be achieved via our solutions to achieve higher throughput and low latency.

UE Power Control Strategies in FD Systems

Distributed adaptive UL power control is discussed hereinbelow.

Distributed adaptive uplink power control methods may be used based on open-loop power control (OLPC) to mitigate BS-BS interference in FD cellular system or dynamic TDD system where simultaneous (same frequency band) DL and UL transmission occur among neighboring cells.

The disclosed techniques may include power control methods that are distributed and cell-specific where each cell can set the OLPC parameter independently based on its BS-BS and conventional co-channel interference (i.e., UE-BS interference) measurement. The adaptive power control methods allow each cell to adjust its target UL received power level in different deployment and interference environments which leverage existing LTE signaling and require less signaling overhead compared with a centralized solution.

Background information is provided hereinbelow. In LTE systems, the open-loop power control (OLPC) is performed in the uplink, $P_{tx} = \min\{P_{max}, P_0 + \alpha PL + 10 \log(\#PRB)\}$, where $P_{max}$ is the maximum UE transmit power, $P_0$ is the target received power level, $\alpha$ is the path-loss compensation factor, PL is the path loss between UE and BS, and PRB is the physical resource block (the power levels in this disclosure are represented in dB scale).

Power control parameters (e.g., Pmax, . . . ) can be stored by an RCN node responsible for recovering the network node post FAFO event. Additionally, the RCN controller may supply an alternate Pmax during recovery to ensure enough power is available for other recovery operations until they complete, then restore fully Pmax.

Distributed adaptive UL power control in different deployment scenarios is discussed herein below.

In an interference-limited deployment scenario, the BSs are often deployed in a clustered environment, hence the BS-BS interference can be very dominant in FD/dynamic TDD type of systems. In the mixture of interference and noise-limited deployment scenarios, some of the BSs are deployed in a cluster while some of them are deployed sparsely. Hence the BSs in a cluster will experience strong BS-BS interference, while for BSs that are deployed sparsely, the BS-BS interference is neglectable as compared to the noise. Hence it is very critical to design the power control algorithms to apply to different deployment scenarios.

Based on the LTE DMRS (Demodulation Reference Signal) or SRS (Sounding Reference Signal), the conventional UL co-channel interference, i.e., UE-BS interference $I_{ul}$ can be estimated. Also, based on LTE CRS (Cell Reference Signal), new BS-BS interference can be estimated at each BS. Once each cell has obtained such interference measurement, it can perform the following steps to adjust its target UL received power ($P_0$ in UL open-loop power control) based on observed BS-BS interference level $I_{bs}$ and UL co-channel interference $I_{ul}$.

Cell-Specific UL power control for FD network (e.g., network initialization phase) is discussed herein below.

During the network initialization phase where all small cells are starting with the same initial power control parameters, the following procedure may be used for every small cell to perform distributed cell-specific UL power control. For an arbitrary cell, say cell j, it can take the following steps to derive its target UL received power level:

Step 0: Initialization: Estimate conventional UE-BS interference $I_{ul,j}$ based on DMRS or SRS and estimate new BS-BS interference $I_{bs,j}$ based on CRS. Initial UE transmit power is based on open-loop power control with a predetermined target receive power level: $(P_0)^{Init}$. For example, $(P_0)^{Init}$ can be set to the recommended $P_0$ value for half-duplex small cell networks.

Step 1: Calculate its power boost factor as $$B_j = \max\left(\min\left(10\log 10\left(\frac{I_{bs}}{I_{ul}}\right), 10\log 10\left(1 + \frac{I_{bs}}{N_0}\right)\right), 0\right)(dB),$$

where $N_0$ is the noise level.

Step 2: Adjust its target UL received power level $P_0 = (P_0)^{Init} + B_j(t)$, where $(P_0)^{Init}$ is the initial $P_0$ setting for OLPC.

Step 3: Update $B_j$ for t (t≥1) times iteration according to $$B_j(t) = B_j(t-1) + \beta \left[ 10\log\left(1 + \frac{(I_{ul,j})^{new}}{I_{bs,j}}\right) - 3 \right]^+ \text{(dB)},$$

where $[x]^+$ denotes max (x, 0); $(I_{ul,j})^{new}$ is the new UE-BS interference estimate after step 2; β (β≥0) is the slope of power-boosting factor update, higher β will lead to higher UL power boosting.

Step 4: After the iteration of calculating the power boost factor, the j-th cell adjusts its target UL received power level $(P_0)^{new}=P_0+B_j(t)$, where $(P_0)^{new}$ is the final OLPC parameter setting and $P_0$ is from step 2. When in a recovery mode, power boost factors may be weighted downward or prohibited until full recovery is achieved.

In the abovementioned steps, steps 1 and step 2 determine the initial cell-specific power control parameter $P_0$ used in OLPC. For different deployment scenarios, different initial $(P_0)^{Init}$ values can be selected to ensure a minimum target UL received power level. By restricting boosting factor, $B_j$, to be non-negative, we can guarantee UL received power is at least the same as the predetermined minimum target UL received power level. The non-negative boosting factor restriction is required under a noise-limited deployment environment where interference from a neighboring base station or UL UEs may be lower than the noise level. When inter-cell interference is stronger than the noise level, the power boost factor can be derived based on local measurement at the base station. If conventional UL interference is stronger than the noise level, the ratio between $I_{bs}$ and $I_{ul}$ can be used to determine the boosting factor. If conventional UL interference is weak, then $I_{bs}$ may be compared with the noise level to minimize SINR degradation due to BS-to-BS interference.

Step 3 and step 4 further adjust power levels based on the observed interference after steps 1-2. Because each cell will boost different levels of UL transmit power (step 1) based on its own observed BS-BS interference, some cells set higher UL power-boosting factors to overcome BS-BS interference but will cause much stronger conventional UL co-channel interference $I_{ul}$, while some cells set lower UL power-boosting factor and will suffer from the increased conventional UL co-channel interference from neighbor cells. Hence one further fine-tuning of UL power control may be performed to ensure every cell achieves good performance. The intuition behind step 3 is that if a cell sees that the new conventional UL co-channel interference $(I_{ul,j})^{new}$ after power control becomes approximately 3 dB stronger than the observed BS-BS interference, then it probably implies that neighboring cells select a higher boosting factor than the serving cell. Therefore, such a cell should further boost its UL transmit power to overcome the increased UL co-channel interference. Depending on the system requirement such as network KPI and complexity requirement, each cell can determine the number of iterations for the UL power control parameter update in step 3.

Cell-Specific UL power control for FD networks (e.g., individual update phase) is discussed herein below.

When a new base station is introduced to the network or when an individual cell needs to re-initiate its power control parameters, a modified procedure can be used for the base station to derive its power control parameters as follows:

Step 1: Obtain a crude $B_j$ estimate. The crude $B_j$ estimate can be obtained via the following two alternative approaches:

(a) Network server provides recommended $B_j$ estimate. Based on cell location or other deployment information, the network server can identify where the j-th cell is and compute a recommended $B_j$ value. The simplest algorithm is to recommend cell j use the same $P_0$ setting as its closest neighbor.

(b) Base station j can eavesdrop the $P_0$ setting of its neighboring cells and then select $B_j$ such that the $P_0$ setting is close to what neighboring cells are currently using.

Step 2~4: the same as step 2~4 in the network initialization phase.

Figure 7:
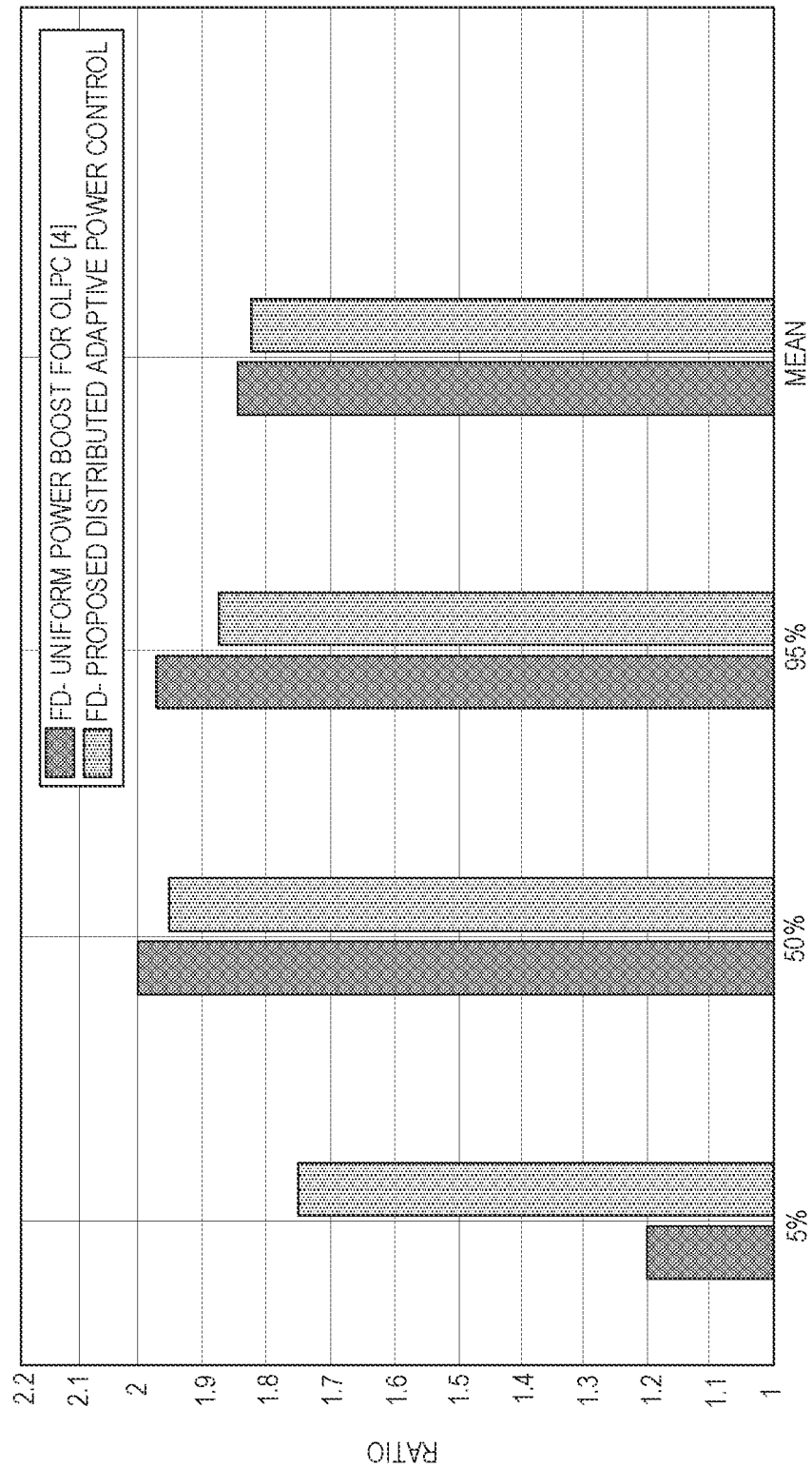
FIG. 7 is a graph of FD gain comparison with different power control methods, according to some example embodiments.

FIG. 7 is a graph 700 of FD gain comparison with different power control methods, according to some example embodiments. FIG. 7 shows the simulation results using a fully standardized LTE small cell system-level simulation, where the y-axis represents the throughput gain over a 10 MHz FDD system (20M spectrum in total). It can be noted from FIG. 7 that the disclosed distributed cell-specific adaptive UL power control algorithm performs more efficiently than the uniform power-boosting method for the cell-edge users at a negligible cost of mean throughput performance. The proposed UL power control methods can achieve a 45.4% improvement in 5-percentile user throughput, which has demonstrated the effectiveness of the proposed distributed UL power control methods to mitigate BS-BS interference for FD or dynamic TDD types of systems.

Inter-Cell Interference Coordination for FD Systems

The disclosed techniques may include an ICIC scheme for FD cellular system. The disclosed techniques may further include two enablers for the ICIC scheme: methods for inter-cell UE-UE interference measurement and detection of network victims and inter-cell aggressors.

ICIC zone selection and resource allocation in a full-duplex cellular system are discussed hereinbelow.

To protect UEs that are more vulnerable to a specific type(s) of interference, special spectrum resources (zones) may be reserved for different purposes of interference mitigation. Below are four different zones that could be used in our proposed ICIC scheme in the FD system:

(a) HD-UL only zone, where only UL is allowed to be operated in the half-duplex mode for all the BSs in the network, either time-division duplexing (TDD) or frequency-division duplexing (FDD).

(b) HD-DL only zone, where only DL is allowed to be operated in the half-duplex mode for all the BSs in the network.

(c) FD-DL centric zone, where DL is prioritized and protected from inter-cell UE-UE interference and is allowed to be operated in the full-duplex mode.

(d) FD-UL centric zone, where UL is prioritized and protected from BS-BS interference and is allowed to be operated in the full-duplex mode.

The ICIC zone selection principles for different UEs in the FD system are as follows:

(a) The network victim UL UEs who suffer from severe BS-BS interference will be assigned to the HD-UL-only zone and cannot access all other zones.

(b) The network victim DL UEs which suffer from severe intra-cell and inter-cell UE-UE interference, where intra-cell joint scheduler cannot mitigate intra-cell UE-UE interference, may be assigned to HD-DL only zone and cannot access all other zones.

(c) The network victim DL UEs who suffer more from inter-cell UE-UE interference may be assigned to FD-DL centric and HD-DL only zone. The corresponding aggressor UL UEs causing strong inter-cell UE-UE interference will be assigned to the FD-UL centric and HD-UL only zone. Moreover, the inter-cell aggressor in the UL-centric zone can transmit at a slightly higher power to compensate for the loss of available transmit zones.

(d) The rest of DL and UL UEs can transmit in all available zones. (For DL UE: FD-DL centric, FD-UL centric, and HD-DL only zones; for UL UE: FD-DL centric, FD-UL centric, and HD-UL only zones.)

The detection methods of network victims and aggressors will be discussed herein below.

In some aspects, the proposed four different zones are orthogonal to each other either in the frequency domain or time domain. Depending on the traffic load, quality-of-service (QoS) requirement, static and dynamic zones allocation may be allowed to effectively mitigate different kinds of inter-cell interference.

BS power allocation strategy in different zones is discussed hereinbelow. In the HD-UL only zone, no DL transmission is allowed and the transmit power of the BS will be set to zero. To enhance DL edge UE performance, the BS can set power in the HD-DL only and FD-DL centric zones to be higher than in the FD-UL centric zone. For example, the BS can set the power ratio between an FD-DL centric zone and an FD-UL centric zone to be $\alpha$, where $\alpha>1$. Per-zone BS power may be selected such that the total power constraint is satisfied for a given $\alpha$.

Inter-cell UE-UE interference measurements in a full-duplex cellular system are discussed herein below.

In some aspects, the disclosed techniques include methods for inter-cell UE-UE interference measurement which may be used to detect network inter-cell aggressors and trigger the use of ICIC to mitigate the inter-cell UE-UE interference caused by such inter-cell aggressors in the FD cellular system.

Figure 8:
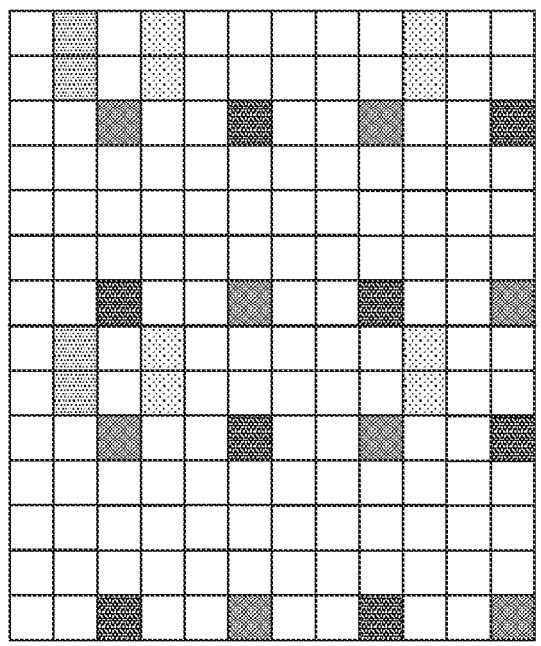
FIG. 8 is LTE OFDM-based subframe and reference signal structure illustration in one PRB with both UE-UE CSI-IM RS and UE-UE IM-RS, according to some example embodiments.

FIG. 8 is LTE OFDM-based subframe and reference signal structure illustration 800 in one PRB with both UE-UE CSI-IM RS and UE-UE IM-RS, according to some example embodiments. FIG. 8 illustrates reference signal designs for FD cellular system. In FIG. 8, the cell-specific reference signal (CRS) is the existing half-duplex downlink reference signal. The UE-UE interference measurement reference signal (UE-UE IM-RS) and UE-UE channel-state-information measurement (CSI-IM) are two new reference signal structures to measure intra-cell UE-UE interference and overall UE-UE interference. In some aspects, a reference design is used to measure inter-cell UE-UE interference. More specifically, the UE-UE IM-RS and CSI-IM structures in FIG. 8 may be used, or new resource elements may be reserved in each subframe, to measure inter-cell uplink to downlink (UE-UE) per pair interference. In some aspects, the size of the resources reserved for inter-cell UE-UE interference measurement depends on the number of potential inter-cell aggressors that the network intends to detect and prevent them from degrading DL performance.

CSI-IM-based measurements are discussed hereinbelow. The CSI-IM resource can be used to transmit UE-specific reference signals to measure the inter-cell UE-UE interference from the scheduled pair. (Quasi-) orthogonal CSI-IM sequence can be used for UEs belongs to different serving cells, i.e., UEs belongs to the same serving cell transmit the same CSI-IM sequence which is (quasi-) orthogonal to the CSI-IM sequence used by neighbor cell UEs. Thus, DL-UEs can distinguish UL interference levels from UEs scheduled in different neighbor cells. If a DL-UE detects strong UL interference from the specific neighbor cell, the DL-UE can send a feedback signal to its serving BS containing information such as the interference level, the neighbor cell ID of the strong interferer and at which PRB it detects strong UL interference. The serving BS can determine whether to characterize the DL-UE as a victim to the neighbor cell based on interference measurement. In addition, the serving BS can solicit over backhaul to learn which UL UE was scheduled by the neighbor cell at the reported PRB to identify neighbor cell aggressor UE.

IM-RS-based measurement is discussed hereinbelow. This method can be used to detect the interference level from a certain set of high potential aggressor UL UEs. The BSs may coordinate to configure the UL UEs (potentially inter-cell aggressors) in the network to transmit UE-UE IM-RS. The UE-UE IM-RS may be orthogonal to other data and reference signal transmissions. Additionally, the UE-UE IM-RS themselves used by different UL UEs may be (quasi-) orthogonal to each other.

After the BSs configure the UL UEs in the network with (quasi-) orthogonal UE-UE IM-RS, the DL UEs (potentially network victims) may measure the interference power received from each configured UL UEs, map or quantize the UE-UE interference measurement information, and feedback such information to BS.

Additional details of the feedback mechanism are provided hereinbelow for detection of network victims and aggressors to trigger the use of ICIC in the FD cellular system.

Detection of network victims and inter-cell aggressors in FD cellular systems is discussed hereinbelow.

To trigger ICIC in the FD system to mitigate inter-cell interference, the network may identify network-vide victims and inter-cell aggressors. The detection methods for network victims and inter-cell aggressors are discussed hereinbelow.

Detection of Network victims and inter-cell aggressors are discussed herein below.

Step 1: The potential network victim DL UEs will be announced first to initiate the detection process either by self-reporting based on its observed CQI measurement or through network assistance where the BS will label a DL UE as a victim if this UE has been observed to have data rate or CQI report below a certain threshold.

Such thresholds can be broadcasted by the network central controller (such as baseband unit (BBU) pool in C-RAN architecture or a general concept for BS cross-cell coordination) based on network KPI values. Similarly, the potential network victim UL UEs can be detected by the BS.

Step 2: After the potential victim DL UEs have been announced, the network central controller can identify the potential corresponding inter-cell UL aggressors via the following two ways.

(a) Based on CSI-IM measurement, DL UE can report a UE that belongs to a certain neighbor cell causing strong interference on certain PRB. By looking up the scheduling decision tables, the network central controller can find out the previously scheduled inter-cell UL UEs together with the victim DL UEs and label them as potential inter-cell UL aggressors.

(b) The BS can also coordinate to configure the UL UEs to transmit reference signals (UE-UE IM-RS) so that the victim DL UEs can measure the per-pair inter-cell UE-UE interference as described in the previous section. Then the victim UEs will send 1-bit wide-band per-pair feedback information to inform the BS whether a particular inter-cell UL UE is an aggressor or not to the victim DL UE, which is explained next.

Other methods of identifying the victim and aggressors in the FD system can also be used. For example, victim/aggressor can be identified from historical data and previous scheduling table, if a victim DL UE always tends to have poor performance when paired up with certain inter-cell UL UEs, then these inter-cell UL UEs can be the potential inter-cell aggressors.

Wide-band UE feedback for identifying victims and inter-cell aggressors is discussed herein.

(a) Victim detection for HD-UL only or HD-DL only zones. The BS can directly compute every UL UE wide-band CQI value in uplink transmission, and the BS can decide if a UL UE is a victim by comparing its CQI with a given threshold, as follows:

$$CQI(UL\ UE) \begin{cases} < \text{threshold, victim('1')} \\ \text{otherwise, non-victim('0')} \end{cases}$$

In the downlink, the DL UE may perform feedback of wide-band CQI to the BS, the BS can decide if a DL UE is a victim by comparing its CQI with a given threshold, as follows:

$$CQI(DL\ UE) \begin{cases} < \text{threshold, victim('1')} \\ \text{otherwise, non-victim('0')} \end{cases}$$

In some embodiments, the threshold can be a hard threshold or soft threshold. For example, using a soft threshold, each BS can set a 5% UL/DL UE as a victim in terms of wide-band CQI. Also, the threshold for HD-UL/DL-only zones depends on the deployment, traffic, and interference scenarios. In a BS-BS interference dominant scenario, for instance, the UL victim threshold may be set higher. While in an intra-cell UE-UE interference dominant scenario, the DL victim threshold may be set higher. In cases where BS-BS and intra-cell UE-UE interference are not dominant, and HD-UL/DL only zones may not be required, the threshold may be set low, i.e., 0%.

Victim detection for FD-DL centric zone and inter-cell aggressor for FD-UL centric zone are discussed herein. The victim DL UE assigned in FD_DL centric zone may need to satisfy two criteria: first, it is a DL victim UE; second, its CQI degradation is caused by inter-cell UE-UE interference.

Thresholds that can be used to detect inter-cell UL aggressors causing strong inter-cell UE-UE interference may be used. After the potential victim DL UEs measure the per-pair inter-cell UE-UE interference power, the DL UEs can perform the following ratio test, where the average BS-UE interference can be measured based on the conventional DL reference signals, i.e., CRS, and the average intra-cell UE-UE interference can be calculated for the victim DL UEs based on reference signals (parameter $\alpha$ and $\beta$ represent the weight (knowledge) of average intra-cell UE-UE and BS-UE interference, respectively). Based on different levels of the knowledge of average intra UE-UE interference ($\alpha$) and conventional BS-UE interference ($\beta$), the DL UE will bitmap the ratio into 1 or 0 to find out the inter-cell aggressors, as follows:

$$\frac{I_{inter-ue2ue}(DL-UE, UL-UE)}{\alpha \times E(I_{intra-ue2ue}(DL-UE)) + \beta \times E(I_{inter-bs2ue}(DL-UE))}$$

$$\begin{cases} > \text{threshold, aggressor('1')} \\ \text{otherwise, non-aggressor('0')} \end{cases}$$

In some aspects, the network will broadcast the threshold for wide-band inter-cell aggressor detection based on overall network-wide long-term channel knowledge. In the following, as examples, three different variations of the ratio test to determine inter-cell aggressors are provided.

Threshold type 1: Inter-cell UE-UE vs. avg. intra-cell UE-UE is determined as follows:

$$\frac{I_{inter-ue2ue}(DL-UE, UL-UE)}{E(I_{intra-ue2ue}(DL-UE))} \begin{cases} > \text{threshold, aggressor('1')} \\ \text{otherwise, non-aggressor('0')} \end{cases},$$

where $\alpha=1$, $\beta=0$.

In this case, the DL UE only computes the ratio between the measured inter-cell UE-UE interference and average intra-cell UE-UE interference. The inter-cell UL UE will be detected as an aggressor if the ratio exceeds a certain threshold.

Threshold type 2: Inter-cell UE-UE vs. avg. BS-UE interference. The inter-cell aggressor can also be detected using another type of threshold. The victim DL UE will measure the inter UE-UE interference, and based on the knowledge of average BS-UE interference, it will bitmap the ratio into 1 or 0 as follows:

$$\frac{I_{intra-ue2ue}(DL-UE, UL-UE)}{E(I_{inter-bs2ue}(DL-UE))} \begin{cases} > \text{threshold, aggressor('1')} \\ \text{otherwise, non-aggressor('0')} \end{cases},$$

where $\alpha=0$, $\beta=1$.

The intuitions behind this type of ratio test are that assuming the intra-cell UE-UE interference can be managed via intra-cell joint scheduling, we will only need to deal with the remaining new inter-cell UE-UE interference if it is stronger than the conventional BS-UE downlink interference.

Threshold type 3: Inter-cell UE-UE vs. avg. overall other interference. The third type of threshold is based on the measured inter-cell UE-UE interference and the avg. intra-cell and BS-UE interference, given below. An inter-cell aggressor is detected if it causes inter-cell UE-UE interference stronger than the average overall other interference, as follows:

$$\frac{I_{inter-ue2ue}(DL-UE, UL-UE)}{E(I_{intra-ue2ue}(DL-UE)) + E(I_{inter-bs2ue}(DL-UE))}$$

$$\begin{cases} > \text{threshold, aggressor('1')} \\ \text{otherwise, non-aggressor('0')} \end{cases},$$

where $\alpha=1$, $\beta=1$.

In some aspects, the threshold can be a hard threshold or soft threshold and may be set depending on network interference and traffic dynamics.

After each BS has gathered the information about victims and associated inter-cell aggressors, the BSs will exchange information or inform the network central controller. Next, the network central controller will signal the BSs who are serving the network-wide victim and aggressor UEs to perform ICIC to mitigate inter-cell UE-UE interference caused by FD operation. The disclosed ICIC scheme may use low overhead cross-cell coordination as the message exchange required for ICIC is wide-band feedback which can be sent infrequently.

Figure 9:
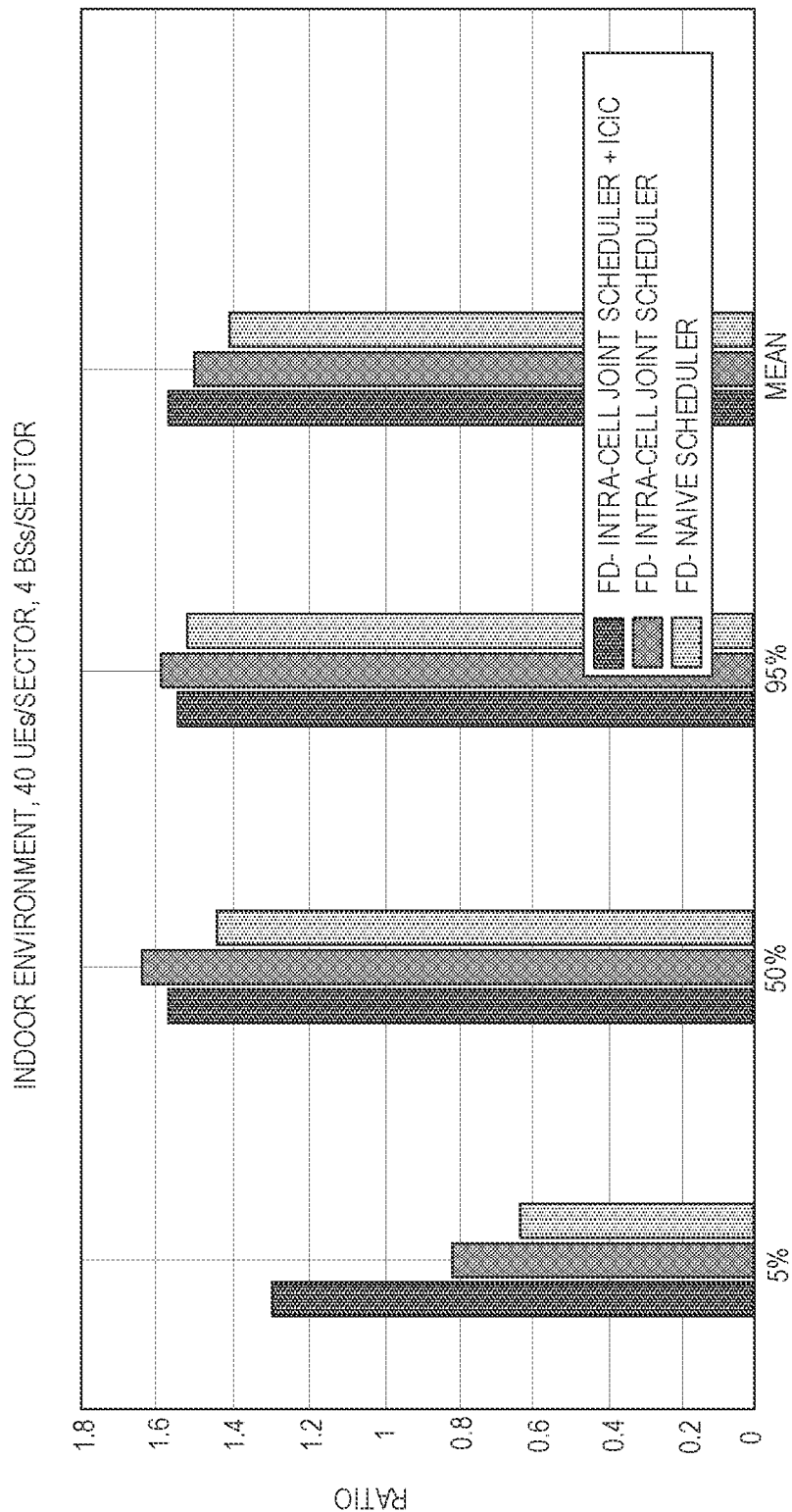
FIG. 9 is a graph of FD gain comparison with and without ICIC, according to some example embodiments.

FIG. 9 is a graph 900 of FD gain comparison with and without ICIC, according to some example embodiments. More specifically, FIG. 9 shows the simulation results using a fully standardized LTE small cell system-level simulation, where the y-axis represents the throughput gain over a 10 MHz FDD system (20M spectrum in total). It can be noted from FIG. 9 that the proposed FD ICIC scheme performs in a more optimal way than no ICIC schemes in terms of 5-percentile throughput for the cell-edge user by more than 58%. This particular result illustrates that mitigating the inter-cell interference, especially inter-cell UE-to-UE interference information is essential to improving FD cellular system performance. By detecting the network victims and aggressors with low-level cross-cell coordination, inter-cell UE-UE interference can be effectively mitigated to improve FD performance.

Figure 10:
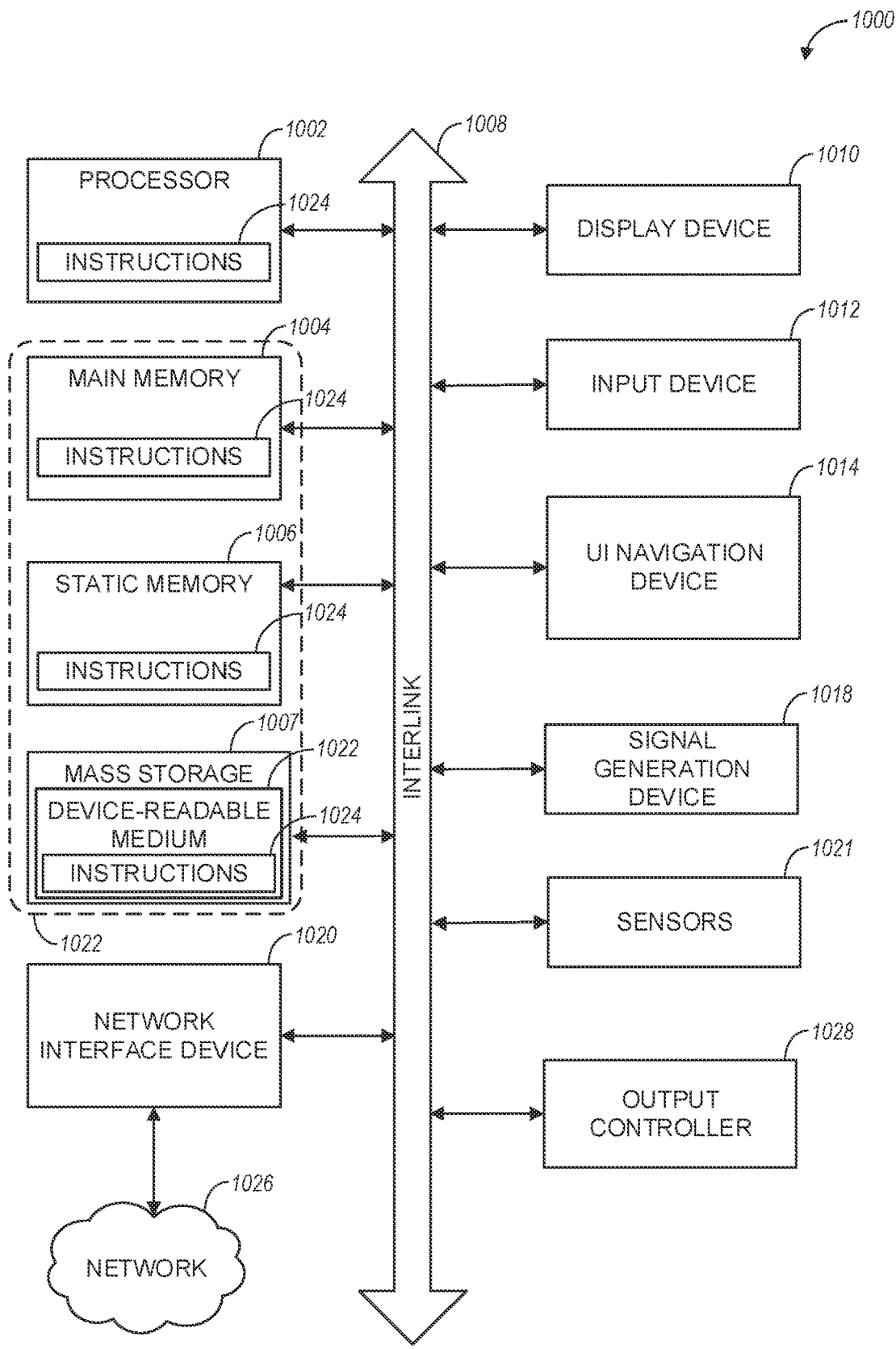
FIG. 10 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects.

FIG. 10 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects and to perform one or more of the techniques disclosed herein. In alternative aspects, the communication device 1000 may operate as a standalone device or may be connected (e.g., networked) to other communication devices.

Circuitry (e.g., processing circuitry) is a collection of circuits implemented in tangible entities of the device 1000 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1000 follow.

In some aspects, the device 1000 may operate as a standalone device or may be connected (e.g., networked) to other devices. In a networked deployment, the communication device 1000 may operate in the capacity of a server communication device, a client communication device, or both in server-client network environments. In an example, the communication device 1000 may act as a peer communication device in a peer-to-peer (P2P) (or other distributed) network environment. The communication device 1000 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 1000 may include a hardware processor 1002 (e.g., a central processing unit (CPU), a graphics processing unit (GPU), a hardware processor core, or any combination thereof), a main memory 1004, a static memory 1006, and a storage device 1007 (e.g., hard drive, tape drive, flash storage, or other block or storage devices), some or all of which may communicate with each other via an interlink (e.g., bus) 1008.

The communication device 1000 may further include a display device 1010, an alphanumeric input device 1012 (e.g., a keyboard), and a user interface (UI) navigation device 1014 (e.g., a mouse). In an example, the display device 1010, input device 1012, and UT navigation device 1014 may be a touchscreen display. The communication device 1000 may additionally include a signal generation device 1018 (e.g., a speaker), a network interface device 1020, and one or more sensors 1021, such as a global positioning system (GPS) sensor, compass, accelerometer, or another sensor. The communication device 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1007 may include a communication device-readable medium 1022, on which is stored one or more sets of data structures or instructions 1024 (e.g., software) embodying or utilized by any one or more of the techniques or functions described herein. In some aspects, registers of the processor 1002, the main memory 1004, the static memory 1006, and/or the storage device 1007 may be, or include (completely or at least partially), the device-readable medium 1022, on which is stored the one or more sets of data structures or instructions 1024, embodying or utilized by any one or more of the techniques or functions described herein. In an example, one or any combination of the hardware processor 1002, the main memory 1004, the static memory 1006, or the mass storage 1016 may constitute the device-readable medium 1022.

As used herein, the term "device-readable medium" is interchangeable with "computer-readable medium" or "machine-readable medium". While the communication device-readable medium 1022 is illustrated as a single medium, the term "communication device-readable medium" may include a single medium or multiple media (e.g., a centralized or distributed database, and/or associated caches and servers) configured to store the one or more instructions 1024. The term "communication device-readable medium" is inclusive of the terms "machine-readable medium" or "computer-readable medium", and may include any medium that is capable of storing, encoding, or carrying instructions (e.g., instructions 1024) for execution by the communication device 1000 and that causes the communication device 1000 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 1024 may further be transmitted or received over a communications network 1026 using a transmission medium via the network interface device 1020 utilizing any one of a number of transfer protocols. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input-multiple-output (SIMO), MIMO, or multiple-input-single-output (MISO) techniques. In some examples, the network interface device 1020 may wirelessly communicate using Multiple User MIMO techniques.

The term "transmission medium" shall be taken to include any non-transitory medium that is capable of storing, encoding, or carrying instructions for execution by the communication device 1000, and includes digital or analog communications signals or another intangible medium to facilitate communication of such software. In this regard, a transmission medium in the context of this disclosure is a device-readable medium.

The following are some additional example aspects associated with the disclosed techniques and FIGS. 1A-10.

Example 1 is an apparatus for a small cell base station (S-BS) configured for operation in a radio access network (RAN) with a macro cell base station (M-BS) and backhaul-capable small cells, the apparatus comprising: processing circuitry, wherein to configure the S-BS for full duplex communication of enhanced control signaling in the RAN, the processing circuitry is to: decode configuration signaling from a plurality of small cell user equipments (S-UEs), the configuration signaling indicating an interference level at each S-UE of the plurality of S-UEs from transmissions of the M-BS; select an S-UE from the plurality of S-UEs based on a comparison of the interference level at each S-UE with an interference threshold of each S-UE of the plurality of S-UEs, the interference threshold associated with decoding control signaling from the S-BS at a minimum modulation and coding scheme (MCS) level; and encode the control signaling for transmission to the selected S-UE via a small cell access (S-AC) communication link, the control signaling transmitted during reception of downlink data from the M-BS via a primary backhaul communication link; and a memory coupled to the processing circuitry and configured to store the configuration signaling.

In Example 2, the subject matter of Example 1 includes, wherein the control signaling includes uplink scheduling grant information for uplink transmission by the S-UE.

In Example 3, the subject matter of Examples 1-2 includes, wherein the configuration signaling further indicates: a power scaling factor associated with each S-UE of the plurality of S-UEs, the power scaling factor indicative of transmit power reduction during transmission of second control signaling by each S-UE of the plurality of S-UEs.

In Example 4, the subject matter of Example 3 includes, wherein the processing circuitry is further to: select a second S-UE from the plurality of S-UEs based on a comparison of an interference level at the M-BS from transmissions by the plurality of S-UEs with an interference threshold associated with the M-BS, the interference level at the M-BS scaled by the power scaling factor.

In Example 5, the subject matter of Example 4 includes, wherein the processing circuitry is further to: decode the second control signaling, the second control signaling received from the second S-UE via the S-AC communication link during transmission of uplink data to the M-BS via the primary backhaul communication link.

In Example 6, the subject matter of Example 5 includes, wherein the second control signaling comprises at least one of channel quality information (CQI) associated with the S-AC communication link; Multiple-input-multiple-output (MIMO) precoding matrix indicator (PMI) and rank indicator (RI); and a channel estimation reference signal.

In Example 7, the subject matter of Examples 1-6 includes, wherein the processing circuitry is further to: decode second configuration signaling from the M-BS, the second configuration signaling indicating an interference level at the M-BS from transmissions by each S-UE of the plurality of S-UEs.

In Example 8, the subject matter of Example 7 includes, wherein the processing circuitry is further to: select a second S-UE from the plurality of S-UEs based on a comparison of the interference level at the M-BS from transmissions by the plurality of S-UEs with an interference threshold of the M-BS, the interference threshold associated with decoding control signaling from the S-BS at a minimum modulation and coding scheme (MCS) level.

In Example 9, the subject matter of Example 8 includes, wherein the processing circuitry is further to: encode second control signaling for transmission to the M-BS, the second control signaling transmitted to the M-BS via the primary backhaul communication link during reception of uplink data from the selected second S-UE via the S-AC communication link.

In Example 10, the subject matter of Examples 1-9 includes, transceiver circuitry coupled to the processing circuitry; and one or more antennas coupled to the transceiver circuitry.

Example 11 is a non-transitory computer-readable storage medium that stores instructions for execution by one or more processors of a small cell base station (S-BS), the instructions to configure the S-BS for operation in a radio access network (RAN) with a macro cell base station (M-BS) and backhaul-capable small cells, and to cause the S-BS to perform operations comprising: decoding configuration signaling from a plurality of small cell user equipments (S-UEs), the configuration signaling indicating an interference level at each S-UE of the plurality of S-UEs from transmissions of the M-BS; selecting an S-UE from the plurality of S-UEs based on a comparison of the interference level at each S-UE with an interference threshold of each S-UE of the plurality of S-UEs, the interference threshold associated with decoding control signaling from the S-BS at a minimum modulation and coding scheme (MCS) level, and encoding the control signaling for transmission to the selected S-UE via a small cell access (S-AC) communication link, the control signaling transmitted during reception of downlink data from the M-BS via a primary backhaul communication link.

In Example 12, the subject matter of Example 11 includes, wherein the control signaling includes uplink scheduling grant information for uplink transmission by the S-UE.

In Example 13, the subject matter of Examples 11-12 includes, wherein the configuration signaling further indicates a power scaling factor associated with each S-UE of the plurality of S-UEs, the power scaling factor indicative of transmit power reduction during transmission of second control signaling by each S-UE of the plurality of S-UEs.

In Example 14, the subject matter of Example 13 includes, wherein the instructions further cause the S-BS to perform operations comprising: selecting a second S-UE from the plurality of S-UEs based on a comparison of an interference level at the M-BS from transmissions by the plurality of S-UEs with an interference threshold associated with the M-BS, the interference level at the M-BS scaled by the power scaling factor.

In Example 15, the subject matter of Example 14 includes, wherein the instructions further cause the S-BS to perform operations comprising: decoding the second control signaling, the second control signaling received from the second S-UE via the S-AC communication link during transmission of uplink data to the M-BS via the primary backhaul communication link.

In Example 16, the subject matter of Example 15 includes, wherein the second control signaling comprises at least one of channel quality information (CQI) associated with the S-AC communication link; Multiple-input-multiple-output (MIMO) precoding matrix indicator (PMI) and rank indicator (RI); and a channel estimation reference signal.

In Example 17, the subject matter of Examples 11-16 includes, wherein the instructions further cause the S-BS to perform operations comprising: decoding second configuration signaling from the M-BS, the second configuration signaling indicating an interference level at the M-BS from transmissions by each S-UE of the plurality of S-UEs.

In Example 18, the subject matter of Example 17 includes, wherein the instructions further cause the S-BS to perform operations comprising: selecting a second S-UE from the plurality of S-UEs based on a comparison of the interference level at the M-BS from transmissions by the plurality of S-UEs with an interference threshold of the M-BS, the interference threshold associated with decoding control signaling from the S-BS at a minimum modulation and coding scheme (MCS) level, and encoding second control signaling for transmission to the M-BS, the second control signaling transmitted to the M-BS via the primary backhaul communication link during reception of uplink data from the selected second S-UE via the S-AC communication link.

Example 19 is a non-transitory computer-readable storage medium that stores instructions for execution by one or more processors of a small cell user equipment (S-UE), the instructions to configure the S-UE for operation in a radio access network (RAN) with a macro cell base station (M-BS), a small cell base station (S-BS), and backhaul-capable small cells, and to cause the S-UE to perform operations comprising: encoding configuration signaling for transmission to the S-BS, the configuration signaling indicating an interference level at the S-UE from transmissions of the M-BS; encoding second configuration signaling for transmission to the S-BS, the second configuration signaling indicating a power scaling factor associated with the S-UE; decoding control signaling received via a small cell access (S-AC) communication link during a first full-duplex transmission by the S-BS, the full-duplex transmission based on the interference level; and encoding second control signaling for transmission during a full-duplex reception by the S-BS based on the power scaling factor.

In Example 20, the subject matter of Example 19 includes, wherein the instructions further cause the S-UE to perform operations comprising: scaling transmit power for the transmission of the second control signaling, the scaling based on the power scaling factor.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a small cell base station (S-BS) configured for operation in a radio access network (RAN) with a macro cell base station (M-BS) and backhaul-capable small cells, the apparatus comprising:
processing circuitry, wherein to configure the S-BS for full-duplex (FD) communication of enhanced control signaling in the RAN, the processing circuitry is to:
decode configuration signaling from a plurality of small cell user equipments (S-UEs), the configuration signaling indicating an interference level at each S-UE of the plurality of S-UEs from transmissions of the M-BS;
select an S-UE from the plurality of S-UEs based on a comparison of the interference level at each S-UE with an interference threshold of each S-UE of the plurality of S-UEs, the interference threshold associated with decoding control signaling from the S-BS; and
encode the control signaling for transmission to the selected S-UE via a small cell access (S-AC) communication link, the control signaling transmitted during reception of downlink data from the M-BS via a primary backhaul communication link; and
a memory coupled to the processing circuitry and configured to store the configuration signaling.

2. The apparatus of claim 1, wherein the control signaling includes uplink scheduling grant information for an uplink transmission by the S-UE, and wherein the interference threshold is associated with decoding the control signaling from the S-BS at a minimum modulation and coding scheme (MCS) level.

3. The apparatus of claim 1, wherein the configuration signaling further indicates:
a power scaling factor associated with each S-UE of the plurality of S-UEs, the power scaling factor indicative of transmit power reduction during transmission of second control signaling by each S-UE of the plurality of S-UEs.

4. The apparatus of claim 3, wherein the processing circuitry is further to:
select a second S-UE from the plurality of S-UEs based on a comparison of an interference level at the M-BS from transmissions by the plurality of S-UEs with an interference threshold associated with the M-BS, the interference level at the M-BS scaled by the power scaling factor.

5. The apparatus of claim 4, wherein the processing circuitry is further to:
decode the second control signaling, the second control signaling received from the second S-UE via the S-AC communication link during transmission of uplink data to the M-BS via the primary backhaul communication link.

6. The apparatus of claim 5, wherein the second control signaling comprises at least one of:
channel quality information (CQI) associated with the S-AC communication link;
Multiple-input-multiple-output (MIMO) precoding matrix indicator (PMI) and rank indicator (RI); and
a channel estimation reference signal.

7. The apparatus of claim 1, wherein the processing circuitry is further to:
decode second configuration signaling from the M-BS, the second configuration signaling indicating an interference level at the M-BS from transmissions by each S-UE of the plurality of S-UEs.

8. The apparatus of claim 7, wherein the processing circuitry is further to:
select a second S-UE from the plurality of S-UEs based on a comparison of the interference level at the M-BS from transmissions by the plurality of S-UEs with an interference threshold of the M-BS, the interference threshold of the M-BS associated with decoding control signaling from the S-BS at a minimum modulation and coding scheme (MCS) level.

9. The apparatus of claim 8, wherein the processing circuitry is further to:
encode second control signaling for transmission to the M-BS, the second control signaling transmitted to the M-BS via the primary backhaul communication link during reception of uplink data from the selected second S-UE via the S-AC communication link.

10. The apparatus of claim 1, further comprising transceiver circuitry coupled to the processing circuitry; and one or more antennas coupled to the transceiver circuitry.

11. A non-transitory computer-readable storage medium that stores instructions for execution by one or more processors of a small cell base station (S-BS), the instructions to configure the S-BS for operation in a radio access network (RAN) with a macro cell base station (M-BS) and backhaul-capable small cells, and to cause the S-BS to perform operations comprising:
decoding configuration signaling from a plurality of small cell user equipments (S-UEs), the configuration signaling indicating an interference level at each S-UE of the plurality of S-UEs from transmissions of the M-BS;
selecting an S-UE from the plurality of S-UEs based on a comparison of the interference level at each S-UE with an interference threshold of each S-UE of the plurality of S-UEs, the interference threshold associated with decoding control signaling from the S-BS; and
encoding the control signaling for transmission to the selected S-UE via a small cell access (S-AC) communication link, the control signaling transmitted during reception of downlink data from the M-BS via a primary backhaul communication link.

12. The non-transitory computer-readable storage medium of claim 11, wherein the control signaling includes uplink scheduling grant information for an uplink transmission by the S-UE, and wherein the interference threshold is associated with decoding the control signaling from the S-BS at a minimum modulation and coding scheme (MCS) level.

13. The non-transitory computer-readable storage medium of claim 11, wherein the configuration signaling further indicates a power scaling factor associated with each S-UE of the plurality of S-UEs, the power scaling factor indicative of transmit power reduction during transmission of second control signaling by each S-UE of the plurality of S-UEs.

14. The non-transitory computer-readable storage medium of claim 13, wherein the instructions further cause the S-BS to perform operations comprising:
selecting a second S-UE from the plurality of S-UEs based on a comparison of an interference level at the M-BS from transmissions by the plurality of S-UEs with an interference threshold associated with the M-BS, the interference level at the M-BS scaled by the power scaling factor.

15. The non-transitory computer-readable storage medium of claim 14, wherein the instructions further cause the S-BS to perform operations comprising:
   decoding the second control signaling, the second control signaling received from the second S-UE via the S-AC communication link during transmission of uplink data to the M-BS via the primary backhaul communication link.

16. The non-transitory computer-readable storage medium of claim 15, wherein the second control signaling comprises at least one of:
   channel quality information (CQI) associated with the S-AC communication link;
   Multiple-input-multiple-output (MIMO) precoding matrix indicator (PMI) and rank indicator (RI); and
   a channel estimation reference signal.

17. The non-transitory computer-readable storage medium of claim 11, wherein the instructions further cause the S-BS to perform operations comprising:
   decoding second configuration signaling from the M-BS, the second configuration signaling indicating an interference level at the M-BS from transmissions by each S-UE of the plurality of S-UEs.

18. The non-transitory computer-readable storage medium of claim 17, wherein the instructions further cause the S-BS to perform operations comprising:
   selecting a second S-UE from the plurality of S-UEs based on a comparison of the interference level at the M-BS from transmissions by the plurality of S-UEs with an interference threshold of the M-BS, the interference threshold of the M-BS associated with decoding control signaling from the S-BS at a minimum modulation and coding scheme (MCS) level; and
   encoding second control signaling for transmission to the M-BS, the second control signaling transmitted to the M-BS via the primary backhaul communication link during reception of uplink data from the selected second S-UE via the S-AC communication link.

* * * * *